United States Patent
Kim et al.

(10) Patent No.: US 11,499,035 B2
(45) Date of Patent: *Nov. 15, 2022

(54) MOLDED ARTICLE

(71) Applicant: Furukawa Electric Co., Ltd., Tokyo (JP)

(72) Inventors: Jaekyung Kim, Tokyo (JP); Kenichi Suyama, Tokyo (JP); Yasuo Nakajima, Tokyo (JP); Eiji Kozawa, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/833,071

(22) Filed: Mar. 27, 2020

(65) Prior Publication Data

US 2020/0224008 A1 Jul. 16, 2020

Related U.S. Application Data

(63) Continuation of application No. PCT/JP2018/036583, filed on Sep. 28, 2018.

(30) Foreign Application Priority Data

| Sep. 29, 2017 | (JP) | ............................. JP2017-190819 |
| Sep. 29, 2017 | (JP) | ............................. JP2017-190820 |
| Sep. 29, 2017 | (JP) | ............................. JP2017-190822 |
| Sep. 29, 2017 | (JP) | ............................. JP2017-190823 |
| Oct. 31, 2017 | (JP) | ............................. JP2017-210341 |
| May 22, 2018 | (JP) | ............................. JP2018-098148 |

(51) Int. Cl.
| *C08L 1/02* | (2006.01) |
| *C08L 101/02* | (2006.01) |
| *H01R 13/504* | (2006.01) |
| *F21V 15/01* | (2006.01) |
| *C08L 51/06* | (2006.01) |

(52) U.S. Cl.
CPC .............. *C08L 1/02* (2013.01); *C08L 101/025* (2013.01); *C08L 51/06* (2013.01); *F21V 15/01* (2013.01); *H01R 13/504* (2013.01)

(58) Field of Classification Search
CPC ......... C08L 1/02; C08L 101/025; C08L 51/06
See application file for complete search history.

(56) References Cited

U.S. PATENT DOCUMENTS

| 3,464,952 | A | 9/1969 | Larsen |
| 3,645,939 | A | 2/1972 | Gaylord |
| 3,856,724 | A | 12/1974 | O'Connor et al. |
| 3,962,157 | A | 6/1976 | Nakano et al. |
| 4,380,522 | A | 4/1983 | Georlette et al. |
| 2003/0157351 | A1 | 8/2003 | Swatloski et al. |
| 2004/0214925 | A1 | 10/2004 | Sigworth |
| 2005/0288484 | A1 | 12/2005 | Holbrey et al. |
| 2007/0141337 | A1* | 6/2007 | Mehta ..................... C08L 43/04 428/393 |
| 2007/0208110 | A1* | 9/2007 | Sigworth ............ C08L 23/0815 524/13 |
| 2008/0146701 | A1 | 6/2008 | Sain et al. |
| 2008/0188636 | A1 | 8/2008 | Argyropoulos et al. |
| 2010/0267942 | A1 | 10/2010 | Buchanan et al. |
| 2010/0292381 | A1 | 11/2010 | Kamikawa |
| 2010/0305249 | A1 | 12/2010 | Buchanan et al. |
| 2011/0086948 | A1 | 4/2011 | Han et al. |
| 2011/0244217 | A1 | 10/2011 | Matsushita |
| 2011/0244223 | A1 | 10/2011 | Matsushita |
| 2012/0041080 | A1 | 2/2012 | Buchanan et al. |
| 2012/0121830 | A1 | 5/2012 | Buchanan et al. |
| 2012/0214911 | A1 | 8/2012 | Yano et al. |
| 2012/0225976 | A1 | 9/2012 | Bampi |
| 2014/0073776 | A1 | 3/2014 | Shiramizu et al. |
| 2014/0121307 | A1 | 5/2014 | Cao et al. |
| 2014/0227605 | A1 | 8/2014 | Nakamura et al. |
| 2014/0336309 | A1* | 11/2014 | Sakata ..................... C08K 7/02 524/35 |
| 2014/0343271 | A1 | 11/2014 | Buchanan et al. |
| 2014/0350188 | A1* | 11/2014 | Hamad .................... C08L 51/02 525/190 |
| 2015/0105499 | A1 | 4/2015 | Yano et al. |
| 2016/0002461 | A1 | 1/2016 | Tsujii et al. |
| 2016/0075877 | A1 | 3/2016 | Kaiser |
| 2016/0229997 | A1 | 8/2016 | Mohanty et al. |
| 2016/0289375 | A1 | 10/2016 | Nakamura et al. |

(Continued)

FOREIGN PATENT DOCUMENTS

| CN | 101896551 A | 11/2010 |
| CN | 102040831 A | 5/2011 |

(Continued)

OTHER PUBLICATIONS

English-language machine translation of JP2005187524A ("Ota"), performed on Espacenet on Apr. 20, 2021, 11 pages.*
English translation of International Search Report and Written Opinion for Application No. PCT/JP2018/036583, dated Jan. 8, 2019.
English translation of International Preliminary Report on Patentability for Application No. PCT/JP2018/036583, dated Mar. 31, 2020.
English translation of Written Opinion for Application No. PCT/JP2018/036583, dated Jan. 8, 2019.
Brintzinger, Hans H. et al., "Stereospecific Olefin Polymerization with Chiral Metallocene Catalysts", Angewandte Chemie International Edition in English, vol. 34, Issue 11, Jun. 16, 1995, 1143-1170.

(Continued)

*Primary Examiner* — Liam J Heincer
(74) *Attorney, Agent, or Firm* — Dorsey & Whitney LLP

(57) ABSTRACT

The present disclosure relates to a molded article provided with a resin part formed with a thermoplastic resin composition. The thermoplastic resin composition containing thermoplastic resins and cellulose, wherein at least one of the thermoplastic resins is a resin having in a polymer molecule at least one group selected from a group containing a partial structure of an acid anhydride and a group containing an acylated cellulose structure.

8 Claims, 6 Drawing Sheets

(56) References Cited

U.S. PATENT DOCUMENTS

| | | | |
|---|---|---|---|
| 2017/0002182 A1 | 1/2017 | Imai et al. | |
| 2017/0218188 A1* | 8/2017 | Kozawa | B32B 27/08 |
| 2019/0023877 A1 | 1/2019 | Kozawa et al. | |
| 2019/0023882 A1 | 1/2019 | Kim et al. | |
| 2019/0031858 A1 | 1/2019 | Kozawa et al. | |
| 2020/0010654 A1 | 1/2020 | Kim et al. | |
| 2020/0224007 A1 | 7/2020 | Kim et al. | |
| 2020/0224009 A1* | 7/2020 | Kim | C08G 81/02 |
| 2020/0255630 A1 | 8/2020 | Kim et al. | |

FOREIGN PATENT DOCUMENTS

| | | |
|---|---|---|
| CN | 103534275 A | 1/2014 |
| CN | 104292412 A | 1/2015 |
| CN | 104334615 A | 2/2015 |
| EP | 0822223 A1 | 2/1998 |
| EP | 0897943 A2 | 2/1999 |
| EP | 2268857 A1 | 1/2011 |
| EP | 2419453 A1 | 2/2012 |
| EP | 2419454 A1 | 2/2012 |
| EP | 2492305 A1 | 8/2012 |
| EP | 2268857 B1 | 9/2012 |
| EP | 3216806 A1 | 9/2017 |
| EP | 3604424 A1 | 2/2020 |
| EP | 3689972 A1 | 8/2020 |
| JP | S55131031 A | 10/1980 |
| JP | S6239642 A | 2/1987 |
| JP | S6333448 A | 2/1988 |
| JP | H08267597 A | 10/1996 |
| JP | H09316248 A | 12/1997 |
| JP | H101575 A | 1/1998 |
| JP | H11217468 A | 8/1999 |
| JP | 2000264974 A | 9/2000 |
| JP | 3479661 B2 | 12/2003 |
| JP | 2005187524 A | 7/2005 |
| JP | 4013870 B2 | 11/2007 |
| JP | 2008297364 A | 12/2008 |
| JP | 2009167250 A | 7/2009 |
| JP | 2010089483 A | 4/2010 |
| JP | 2011093990 A | 5/2011 |
| JP | 2011116838 A | 6/2011 |
| JP | 2011213966 A | 10/2011 |
| JP | 2011219571 A | 11/2011 |
| JP | 2012087199 A | 5/2012 |
| JP | 2012102324 A | 5/2012 |
| JP | 2012207063 A | 10/2012 |
| JP | 2012524145 A | 10/2012 |
| JP | 2012214563 A | 11/2012 |
| JP | 2012236906 A | 12/2012 |
| JP | 2013056958 A | 3/2013 |
| JP | 2013107987 A | 6/2013 |
| JP | 2013189574 A | 9/2013 |
| JP | 2013234268 A | 11/2013 |
| JP | 2013248824 A | 12/2013 |
| JP | 2014001361 A | 1/2014 |
| JP | 2014129509 A | 7/2014 |
| JP | 2014193959 A | 10/2014 |
| JP | 2015050052 A | 3/2015 |
| JP | 2015183153 A | 10/2015 |
| JP | 2015203093 A | 11/2015 |
| JP | 2015209439 A | 11/2015 |
| JP | 2016017096 A | 2/2016 |
| JP | 2016094516 A | 5/2016 |
| JP | 2017128717 A | 7/2017 |
| JP | 2017145392 A | 8/2017 |
| JP | 2017145393 A | 8/2017 |
| JP | 2017155248 A | 9/2017 |
| JP | 2017171698 A | 9/2017 |
| KR | 20100129293 A | 12/2010 |
| WO | 03029329 A2 | 4/2003 |
| WO | 2008069121 A1 | 6/2008 |
| WO | 2009118262 A1 | 10/2009 |
| WO | 2010120269 A1 | 10/2010 |
| WO | 2013035786 A1 | 3/2013 |
| WO | 2013133093 A1 | 9/2013 |

| | | | |
|---|---|---|---|
| WO | 2015039237 A1 | 3/2015 | |
| WO | 2015152189 A1 | 10/2015 | |
| WO | WO-2016063914 A1 * | 4/2016 | C08L 23/12 |
| WO | 2015053226 A1 | 3/2017 | |
| WO | 2017141779 A1 | 8/2017 | |
| WO | 2017165957 A1 | 10/2017 | |
| WO | 2017170745 A1 | 10/2017 | |
| WO | 2017170746 A1 | 10/2017 | |
| WO | 2017170747 A1 | 10/2017 | |

OTHER PUBLICATIONS

Ewen, John et al., "Syndiospecific Propylene Polymerizations With Group 4 Metallocenes", Journal of the American Chemical Society, vol. 110 No. 18, Aug. 1, 1988, 6255.
Wahlström, Ronny et al., "Enzymatic Hydrolysis of Lignocellulosic Polysaccharides in the Presence of Ionic Liquids", Green Chemistry, vol. 17, Nov. 7, 2014, 694-714.
Yamashita, Shinzo et al., Handbook of Crosslinking Agent, Oct. 1981, 162.
Zambelli, A. et al., "Model Compounds and 13C NMR Observation of Stereosequences of Polypropylene", Macromolecules vol. 8 No. 5, Sep. 1, 1975, 687.
Extended European Search Report for EP Application No. 18860626.3, dated Jun. 4, 2021.
Suzuki, Katsuhito et al., "Development of continuous process enabling nanofibrillation of pulp and melt compounding", Cellulose, Springer Netherlands, Netherlands, vol. 20, No. 1, Feb. 1, 2013, (Feb. 1, 2013), pp. 201-210, XP036830877.
English translation of Office Action for CN Application No. 201880063819.9, dated Jun. 29, 2021.
English-language machine translation of JP201207063, performed on Espacenet on Sep. 1, 2021.
Satas, D. et al., "Coatings Technology Handbook (Second Edition)", China Petrochemical Press, Jan. 2003, 9 pgs.
English Translation of Chinese Office Action dated Sep. 3, 2020 for Chinese Application No. 201780017867.X.
English Translation of International Search Report dated Jul. 4, 2017 for PCT Application No. PCT/JP2017/013023.
English Translation of Notice of Reasons for Refusal dated Feb. 9, 2021 for Japanese Application No. 2018-509369.
English Translation of Notice of Reasons for Refusal dated Jul. 20, 2021 for Japanese Application No. 2018-509369.
English machine translation JP2013-248824 A obtained via Espacenet on Jul. 20, 2021.
English machine translation JP2015-050052 A obtained via Espacenet on Jul. 20, 2021.
English machine translation JP2016-017096 A obtained via Espacenet on Jul. 20, 2021.
English machine translation of JP2014-129509 A obtained via Espacenet on Jul. 20, 2021.
English machine translation of JP2017-171698 A obtained via Espacenet on Jul. 20, 2021.
English machine translation of JPH09-316248A obvtained via Espacenet on Jul. 20, 2021.
English machine translation of JPH-10-1575 A obtained via Espacenet on Jul. 20, 2021.
English machine translation of JPH11-217468 A obtained via Espacenet Jul. 20, 2021.
English machine translation of JPS55131031A obtained via Espacenet on Jul. 20, 2021.
English machine translation of WO 2008/069121 A1 obtained via Espacenet on Jul. 20, 2021.
Extended European Search Report dated Nov. 27, 2019 for European Application No. 17775280.5.
[English Translation] Second Office Action dated Jan. 24, 2022 for Chinese Patent Application No. 201880063819.9, pp. all.
[English Translation] Second Office Action dated Jan. 29, 2022 for Chinese Patent Application No. 201880063823.5, pp. all.
[English Translation] Duan, Jiufang "Natural Polymeric Materials", Wuhan: Huazhong University of Science and Technology Press; ISBN 978-7-5680-1309-3, Jun. 2011, pp. all.

(56) References Cited

OTHER PUBLICATIONS

[English Translation] Wang, Guoquan, "Principles and Applications of Polymer Blend Modification", Beijing: China Light Industry Press ISBN 978-7-5019-5741-5, Jul. 2007, pp. all.
Decision of Rejection for CN Application No. 201880009893.2, dated Jan. 18, 2022; pp. all [English Translation].
Non Final Rejection Action dated Mar. 15, 2022 for U.S. Appl. No. 16/832,986; pp. all.
Non Final Rejection Action dated Mar. 15, 2022 for U.S. Appl. No. 16/833,222; pp. all.
Office Action received in U.S. Appl. No. 16/143,846 dated Jun. 23, 2021.
[English Translation] Decision of Rejection dated Mar. 25, 2021 for Chinese Application No. 201780017841.5.
[English Translation] First Office Action dated Aug. 26, 2020 for Chinese Application No. 201780018439.9.
[English Translation] First Office Action dated Jan. 19, 2022 for Chinese Patent Application No. 201880070847.3.
[English Translation] First Office Action dated Jun. 11, 2021 for the Chinese Patent Application No. 201880009893.2.
[English Translation] International Search Report dated Jul. 4, 2017 for PCT Application No. PCT/JP2017/013024.
[English Translation] International Search Report dated Jun. 12, 2018 for International Patent Application Application No. PCT/JP2018/009757.
[English Translation] International Search Report dated Jun. 27, 2017 for PCT Application No. PCT/JP2017/013022.
[English Translation] Notice of Reasons for Refusal dated Feb. 9, 2021 for Japanese Patent Application No. 2018-509368.
[English Translation] Notice of Reasons for Refusal dated Feb. 9, 2021 for Japanese Patent Application No. 2018-509370.
[English Translation] Notice of Reasons for Refusal dated Sep. 14, 2021 for Japanese Patent Application No. 2019-509210.
[English Translation] Second Office Action dated Jan. 30, 2022 for Chinese Patent Application No. 201880063825.4.
[English Translation] Second Office Action dated Jun 3, 2021 for Chinese Patent Application No. 201780018439.9.
[English Translation] Second Office Action dated Oct. 13, 2021 for Chinese Patent Application No. 201880009893.2.
[English Translation] The First Office Action dated Jul. 3, 2020 for Chinese Application No. 201780017841.5.
[English Translation] The Second Office Action dated Dec. 10, 2020 for Chinese Application No. 201780017841.5.

Extended European Search Report dated Nov. 29, 2019 for European Patent Application No. 17775281.3.
Extended European Search Report dated Nov. 23, 2020 for European Patent Application No. 18776773.6.
Extended European Search Report dated Oct. 8, 2019 for European Patent Application No. EP17775279.7.
Extended European Search Report dated Sep. 15, 2020 for European Patent Application No. 20170209.9.
Communication pursuant to Rule 114(2) EPC with annexed third party observations under Article 115 EPC dated Apr. 12, 2022 for European Patent Application No. 18860626.3.
Non Final Office Action issued in U.S. Appl. No. 16/144,304 dated Apr. 28, 2022; pp. all.
Non Final Office Action issued in U.S. Appl. No. 16/144,430, dated Apr. 28, 2022; pp. all.
The Editors of Encyclopaedia Britannica, "Kraft Process", Encyclopedia Britannica, Sep. 7, 2015, https://www.britannica.com/technology/kraft-process; captured Apr. 23, 2022; pp all.
[English Translation] Notice of Reasons for Refusal dated May 30, 2022 for Japanese Patent Application No. 2019-545198; pp. all.
[English Translation] Notice of Submission of Publications and Reasons for Submission dated Apr. 15, 2022 for Japanese Patent Application No. 2019-545199; pp. all.
[English Translation] Second Office Action dated Jun. 7, 2022 for Chinese Patent Application No. 201880070847.3; pp. all.
[English Translation] Notice of Reasons for Refusal dated Jun. 28, 2022 for Japanese Patent Application No. 2019-550436; pp. all.
[English Translation] Notice of Reasons for Refusal dated Jul. 13, 2022 for Japanese Patent Application No. 2019-545199.
[English Translation] Notice of Reasons for Refusal dated Jul. 13, 2022 for Japanese Patent Application No. 2019-545200.
[English Translation] Rejection Decision dated Jul. 1, 2022 for Chinese Patent Application No. 201880063819.9.
[English Translation] Rejection Decision dated Jul. 1, 2022 for Chinese Patent Application No. 201880063823.5.
[English Translation] Rejection Decision dated Jul. 1, 2022 for Chinese Patent Application No. 201880063825.4.
Juliusz Pernak et al. "New Ionic Liquids and Their Antielectrostatic Properties" 40 Ind. Eng. Chem. Res.; published May 5, 2001; pp. 2379-2383.
[English Translation] Third Office Action dated Aug. 31, 2022 for CN application No. 01880070847.3; pp. all \* cited by examiner

MOLDED ARTICLE

CROSS REFERENCE TO RELATED APPLICATIONS

This is a continuation application of International Patent Application No. PCT/JP2018/036583 filed Sep. 28, 2018, which claims the benefits of Japanese Patent Applications No. 2017-190819 filed Sep. 29, 2017, No. 2017-190820 filed Sep. 29, 2017, No. 2017-190822 filed Sep. 29, 2017, No. 2017-190823 filed Sep. 29, 2017, No. 2017-210341 filed Oct. 31, 2017, No. 2018-098148 filed May 22, 2018 and the full contents of all of which are hereby incorporated by reference in their entirety.

BACKGROUND

Technical Field

The present disclosure relates to a molded article, such as a lamp body of a lighting appliance, a speaker unit, a connection box, a connector, a pulley, and a film for a house, the molded article being provided with a resin part, and particularly relates to a molded article provided with a resin part prepared by injection molding, T-die molding, or the like. In particular, the present disclosure relates to a molded article, such as a lamp body of a lighting appliance, a speaker unit, a connection box, a connector, a pulley, and a film for a house, the molded article being provided with a resin part formed with a thermoplastic resin composition containing cellulose.

Description of the Related Art

In recent years, for the purpose of reducing fuel consumption of a vehicle, such as an automobile, further weight reduction of the vehicle has been required. To reduce the weight of a vehicle, not only the weight of a large part, such as a body forming the vehicle, but also the weights of various members, such as a lighting appliance including a headlight or the like, a speaker unit for automotive application as one component of an audio system to be loaded on the vehicle, a connection box and a connector for an automobile, and a guide pulley for a belt that drives engine accessories or the like of an automobile, need to be reduced.

The lighting appliance for a vehicle is generally provided with a lamp body including an opening, a front cover that covers the opening, an extension, a reflection mirror (reflector), a light source, electrical components, and the like. To reduce the weight of the lighting appliance for a vehicle, it is effective to form the lamp body with a resin material, the lamp body having a relatively high ratio of the weight to the total weight of the lighting appliance for a vehicle among the components of the lighting appliance for a vehicle.

In addition to further weight reduction, improvements in strength characteristics against vibration and in acoustic characteristics as a speaker unit are also required in the speaker unit for automotive application. To meet such requirements, it is desirable to form, for example, a case body (enclosure or cabinet), a frame, and the like of the speaker unit with a suitable compounded material.

The connection box and connector for an automobile is generally produced by performing injection molding using a glass fiber-reinforced thermoplastic resin composition in which a glass fiber is dispersed as a reinforcing material. The use of such a highly strong resin enables thinning and weight reduction of the connection box and the connector. On the other hand, when the connection box, the connector, and the like are produced by injection molding, runner end materials and mis-shot products are produced. In addition, connection boxes, connectors, and the like formed using a glass fiber-reinforced thermoplastic resin are collected from scrapped cars in some cases. However, deterioration in strength of a recycled glass fiber-reinforced thermoplastic resin due to recycling is significant. Therefore, when a recycled glass fiber-reinforced thermoplastic resin is used, thinning and weight reduction of a connection box, a connector, and the like are difficult from the viewpoint of retaining the strength. Thus, a fiber-reinforced material such that effects of thinning and weight reduction are not lost even if it is recycled, the fiber-reinforced material being excellent in recyclability, is desired.

In a pulley for a vehicle, a resin part is in general integrally molded along the outer periphery of a rolling bearing, and the resin part is formed by injection molding using a resin or the like containing a reinforced fiber from the viewpoint of productivity. However, in the case of the injection molding, a gate for adjusting the inlet velocity of a resin material is essential for an injection molding machine. In addition, at a part where the resin materials having flown from the gate into a metal mold join, a weld is produced to generate nonuniformity of the reinforced fiber in a circumferential direction, so that there is a possibility that unevenness in strength and size accuracy occurs. Therefore, when a pulley is produced by injection molding, the size accuracy of the outer peripheral portion, which guides a belt, in the resin part, the strength characteristics and the like to endure the tension of the belt are required. Being excellent in size accuracy is also required similarly in the lamp body.

Such weight reduction and improvements in strength characteristics of various molded members are also required in, for example, molded members, for a house for agriculture, not limited to members for a vehicle, such as an automobile. The house for agriculture is widely used for the purpose of protecting products in the house from the outside and retaining a constant environment. A transparent film using as the main raw material vinyl chloride, polyethylene, a polyethylene-vinyl acetate copolymer, polyethylene terephthalate (PET), a polyethylene-tetrafluoroethylene copolymer, or the like is mainly used as a film for a house for agriculture so that situation of the inside can be grasped to a certain extent from the outside. Further, in recent years, the scale of an agricultural house has been made large in some cases from the viewpoint such as improving productivity. In a large-scale house for agriculture, the weight of the film to be used for the house increases, making an influence on the skeleton that supports the whole house large. In addition, an area where a flying object from the outside contacts increases. Therefore, weight reduction, high modulus of elasticity, and high strength are required in a film for a house. Further, the recyclability of a material is also required in some cases from the viewpoint of efficient utilization of resources in recent years.

To meet the requirements as described above, cellulose is regarded as promising as a compounding material for the resin part which various members are provided with. Cellulose exists on the earth in a large amount and is a renewable natural resource, and therefore cellulose is suitable as a material having a high recyclability. In addition, it is known that cellulose is light in weight, the mechanical characteristics thereof are enhanced by micronizing the cellulose into a micro size, and when the micronization is allowed to progress to a nano size, cellulose becomes a material having extremely high modulus of elasticity and high strength. Further, a resin in which micronized cellulose is compounded has a more satisfactory surface smoothness as compared to a resin in which a glass fiber or a carbon fiber is compounded. Research on utilizing cellulose having such characteristics as a reinforcing material for a thermoplastic resin has been conducted, and the feasibility of the research is attracting attention.

As a method for producing a composite resin containing such a cellulose-based micro fiber and a thermoplastic resin, a method in which a plant fiber is first defibrillated (microfibrillated), and this microfibrillated plant fiber (cellulose-based micro fiber) is mixed and kneaded with a thermoplastic resin, such as polypropylene, using a compatibilizer or interface-reinforcing material for the purpose of controlling dispersibility and an interface of fiber-resin is known (For example, see United States Patent Application Publication No. US 2008/0146701).

However, such a method includes at least a step of defibrillating (microfibrillating) plant fiber and a step of mixing this microfibrillated plant fiber (cellulose-based micro fiber) with a thermoplastic resin, thereby forming a composite. Therefore, the procedure is made complicated, production costs increase, and besides, reaggregation is liable to occur when the microfibrillated plant fiber is kneaded with the thermoplastic resin, and the actual situation is that controlling the reaggregation is difficult.

In recent years, a method in which plant fiber is chemically treated to modify the surface thereof, and this modified plant fiber is then kneaded with a thermoplastic resin with a processing machine has been proposed (For example, see International Publication No. WO 2013/133093). This method is a method of facilitating micronization of plant fiber while kneading the modified plant fiber together with a thermoplastic resin in a processing machine.

However, also in such a method, plant fiber is swollen once, then subjected to action of a chemical substance, dried, and then put into the processing machine in step of a chemical treatment. Therefore, the method which is described in International Publication No. WO 2013/133093 is improved more than a conventional method is, but the procedure is complicated, so that there has been a limitation in cost reduction.

Further, in the case of molding a molded article as described above, a lamp body for example, by injection molding using a composite resin as described in Patent Literature 1, the composite resin containing polypropylene and plant fiber, there is a problem that a metal mold for use in the molding is liable to corrode. Therefore, it is desirable to perform injection molding using a material having corrosivity to a metal mold.

SUMMARY

The present disclosure is related to providing a molded article provided with a resin part formed with a thermoplastic resin composition in which cellulose is micronized in thermoplastic resins.

According to an aspect of the present disclosure, a molded article includes a resin part formed with a thermoplastic resin composition. The thermoplastic resin composition includes thermoplastic resins and cellulose, wherein at least one of the thermoplastic resins is a resin having in a polymer molecule at least one group selected from a group containing a partial structure of an acid anhydride and a group containing an acylated cellulose structure.

Further, it is preferable that the thermoplastic resin composition includes an ionic compound, and a content of the ionic compound is 0.001 times or more and less than 1.000 times a mass of the cellulose contained.

Further, it is preferable that the ionic compound is represented by the following formula (1) or (2):

Formula (1)

Formula (2)

wherein $Z^1$ represents $=C(Ra)-$ or $=N-$, wherein Ra represents a hydrogen atom or a substituent; $L^1$ represents a divalent linking group; $R^1$ to $R^5$ each independently represent an alkyl group, an alkenyl group, a cycloalkyl group, an aryl group, or a heterocyclic group; at least two of $R^2$ to $R^5$ are optionally bonded to each other to form a ring; and $X^-$ represents an anion.

Further, it is preferable that the compound represented by the formula (1) or (2) is represented by any one of the following formulas (1a), (1b), and 2(a) to 2(c):

Formula (1a)

Formula (1b)

Formula (2a)

Formula (2b)

Formula (2c)

wherein $R^1$, $R^2$, and $X^-$ are as defined for $R^1$, $R^2$, and $X^-$ in the formula (1) or (2); $R^{11}$ and $R^{12}$ each independently represent a substituent; $n^{11}$ represents an integer of 0 to 3, and $n^{12}$ represents an integer of 0 to 5; when two or more $R^{11}$ exist, a plurality of $R^{11}$ are optionally the same with or different from each other, and at least two $R^{11}$ are optionally bonded to each other to form a ring;

$R^{13}$ to $R^{15}$ each independently represent an alkyl group, an alkenyl group, a cycloalkyl group, an aryl group, or a heterocyclic group, provided that at least two of $R^2$ and $R^{13}$ to $R^{15}$ are not bonded to each other to form a ring; $R^{21}$ is as defined for $R^2$; and $Z^2$ represents a single bond, a methylene group, —C(=O)—, —O—, —S—, —S(=O)—, —$SO_2$—, —N(R$\alpha$1)-, or —N$^+$(R$\alpha$1)(R$\alpha$2)-, wherein R$\alpha$1 represents a hydrogen atom or a substituent, R$\alpha$2 represents a substituent, and R$\alpha$1 and R$\alpha$2 are optionally bonded to each other to form a ring.

Further, it is preferable that the X$^-$ represents a halogen ion, a carboxylate anion, a sulfonate anion, a phosphate anion, a phosphonate anion, a dicyanamide ion, or a bis(trifluoromethanesulfonyl)imide ion.

Further, it is preferable that the cellulose is a plant-derived, fibrous cellulose.

Further, it is preferable that a content of the cellulose is 1 to 100 parts by mass based on 100 parts by mass of the thermoplastic resins.

Further, it is preferable that a content of the resin having in a polymer molecule a group containing an acid anhydride is 1 to 50% by mass in the thermoplastic resins.

Further, it is preferable that an apparent modulus of elasticity ($Ef_1$) of the cellulose contained in the thermoplastic resin composition is equal to or larger than 1.1 times an apparent modulus of elasticity ($Ef_0$) of the cellulose contained in a thermoplastic resin composition not containing the resin having in a polymer molecule a group containing an acid anhydride.

Further, it is preferable that an apparent modulus of elasticity ($Ef_1$) of the cellulose contained in the thermoplastic resin composition is equal to or larger than 1.1 times an apparent modulus of elasticity ($Ef_0$) of the cellulose contained in a thermoplastic resin composition not containing the ionic compound.

Further, it is preferable that the molded article is a lamp body of a lighting appliance, a speaker unit, a connection box, a connector, a pulley, or a film for a house.

According to the present disclosure, a molded article provided with a resin part molded with a thermoplastic resin composition containing micronized cellulose can be provided

DETAILED DESCRIPTION

Figure 1:
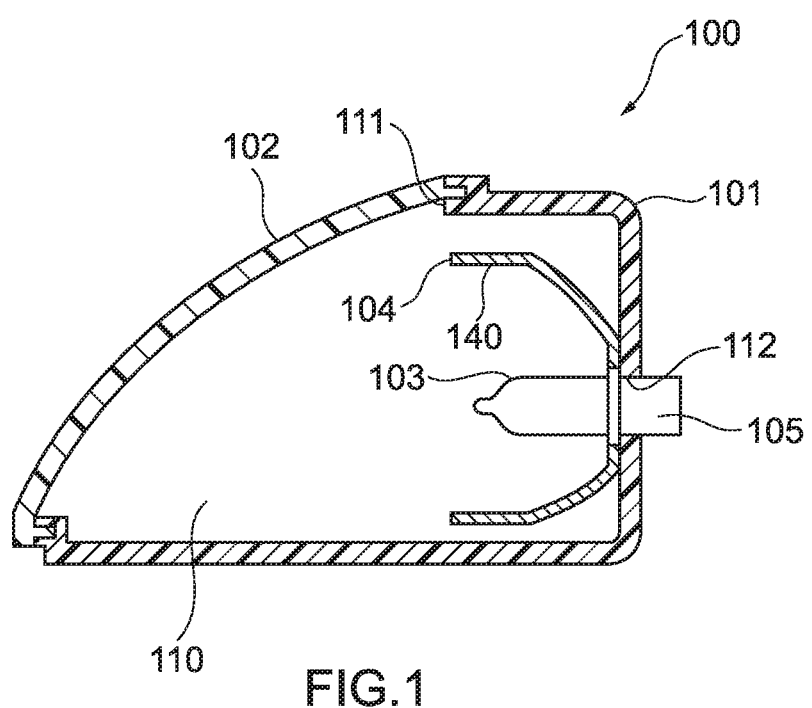
FIG. 1 is a schematic sectional diagram showing an example of a lamp body of a lighting appliance according to an embodiment of a molded article of the present disclosure.

A molded article according to an embodiment of the present disclosure, such as a lamp body of a lighting appliance, a speaker unit, a connection box, a connector, a pulley, or a film for a house, is provided with a resin part formed with a thermoplastic resin composition, the thermoplastic resin composition containing thermoplastic resins and cellulose, wherein at least one of the thermoplastic resins is a resin having in a polymer molecule at least one group selected from a group containing a partial structure of an acid anhydride and a group containing an acylated cellulose structure. Thereby, the molded article provided with a resin part molded with a thermoplastic resin composition containing micronized cellulose can be provided. In addition, by kneading plant-derived cellulose in a thermoplastic resin, micronization of the cellulose can be allowed to progress in the kneading step. Therefore, a step of micronizing the plant-derived cellulose in advance is made unnecessary, so that significant reduction in production costs can be expected. Further, modulus of elasticity increases due to the micronized cellulose, and therefore efficiency of strengthening of a molded article, such as, for example, a lamp body of a lighting appliance, a speaker unit, a connection box, a connector, a pulley, and a film for a house, can be enhanced.

In this way, the present disclosure enables more efficiently providing a molded article provided with a resin part using micronized cellulose. Moreover, by the present disclosure, molded articles, such as a pulley and a lamp body of a lighting appliance each being excellent in size accuracy, a speaker unit being excellent in acoustic characteristics, a connection box, a connector, and a film for a house each being excellent in recyclability, which are reduced in weight and highly strengthened, can be obtained.

<<Thermoplastic Resin Composition>>

The thermoplastic resin composition to be used for a molded article according to an embodiment of the present disclosure, such as a lamp body of a lighting appliance, a speaker unit, a connection box, a connector, a pulley, or a film for a house, contains at least thermoplastic resins and cellulose.

<Thermoplastic Resins>

In the present disclosure, a base resin is a thermoplastic resin, and at least one of the thermoplastic resins is a resin having in a polymer molecule a group containing a partial structure of an acid anhydride. According to the present disclosure, reaggregation of cellulose in the thermoplastic resins can be inhibited, and a rotary member, such as a pulley or a fan, which is highly strengthened and excellent in size accuracy can be obtained by eliminating unevenness in strength and size accuracy. It is to be noted that the base resin refers to a resin component the content of which is largest among the thermoplastic resins contained in the thermoplastic resin composition. In addition, cellulose is not included in the thermoplastic resin.

The thermoplastic resins to be used in the present disclosure, the thermoplastic resins containing a resin having in a polymer molecule a group containing a partial structure of an acid anhydride, are not particularly limited, and may be any of the resins which are each generally used as a thermoplastic resin. This is due to the reason described below.

The present disclosure realizes micronization of cellulose by kneading the cellulose in the thermoplastic resins, as will be described later. Therefore, the viscosity of the thermoplastic resins, when mixed with the cellulose, is an important characteristic. That is, the stress (Fh), which dispersion of the cellulose (including an ionic compound in the case where the ionic compound is added), the dispersion existing in the thermoplastic resins, feels in the shear field, is expressed simply by the following equation (1.1).

$$F_h = 6.12 \eta \dot{\gamma} R \quad (1.1)$$

It is to be noted that hereinafter, γ with ˙ in the equation (1.1) will simply be described as γ. The stress (Fh) which the dispersion feels in the shear field represents the force which a spherical filler having a diameter of R feels in the thermoplastic resins having a shear rate of γ and having a viscosity of η. However, the cellulose existing in the thermoplastic resins is not spherical but is fibrous, therefore the equation as it is cannot be applied, but the equation for the spherical filler and the equation for the fibrous fiber are the same in principle, and it is considered that the parameters (η, γ, R) that affect the stress (Fh) which the dispersion feels in the shear field are also the same. Accordingly, to micronize the cellulose, how much force to be applied in the shear field inside the thermoplastic resins is important, and therefore it is considered that the larger η or γ is, the more advantageous.

Making the shear rate (γ) fast herein means mechanically making a shear rate to be applied to the thermoplastic resins fast. Accordingly, when the shear rate (γ) is made fast, the force which the cellulose feels inside the thermoplastic resins is made large, but the friction force due to kneading is made large at the same time, so that the temperature of the thermoplastic resins increases. However, cellulose generally has a characteristic that it undergoes a color change when the temperature exceeds 200° C. and thermally decomposes from around 300° C., and therefore a method in which cellulose is exposed to a shear field where the temperature is extremely raised is not suitable from the viewpoint of keeping the characteristics as a material.

As can be seen from this, to micronize the cellulose, increasing the viscosity (η) of the thermoplastic resins is important. Generally, the viscosity (η) of a thermoplastic resin satisfies the relationship (Andrade's equation) as follows.

$$\eta = A e^{E_v / RT} \quad (1.2)$$

Herein, A represents a constant of proportionality, Ev represents flow activation energy, R represents a gas constant, and T represents temperature (K). The flow activation energy corresponds to the Arrhenius' activation energy in a chemical reaction and is understood by regarding the flow as a rate process. Accordingly, the important parameter for controlling the viscosity (η) is temperature. The temperature can be handled and adjusted as a processing temperature irrespective of the types of the thermoplastic resins. Accordingly, a wide range of thermoplastic resins each as a medium for giving force that is needed to micronize the cellulose are applicable without any particular restrictions on the types thereof.

[Base Resin]

The base resin is a resin component the content of which is largest among the thermoplastic resins contained in the thermoplastic resin composition, and is contained at least in the same mass as the resin having in a polymer molecule a group containing a partial structure of an acid anhydride. It is to be noted that in the present disclosure, the base resin is a thermoplastic resin other than the resin having in a polymer molecule a group containing a partial structure of an acid anhydride.

Examples of the thermoplastic resin which is the base resin include a polyolefin resin, a polyester resin, a polycarbonate resin, a polyamide resin, a polyimide resin, a polyurethane resin, a polyphenylene sulfide resin, a polyphenylene oxide resin, a cellulose acylate resin, and a phenoxy resin. Among these, a polyolefin resin is preferable in the present disclosure.

<Polyolefin Resin>

The polyolefin resin is a polyolefin resin obtained by polymerizing at least one olefin and may be a homopolymer or a copolymer. Examples of such an olefin include α-olefins having 4 to 12 carbon atoms, including ethylene, propylene, isobutylene, and isobutene (1-butene), butadiene, isoprene, a (meth)acrylate, (meth)acrylic acid, (meth)acrylamide, vinyl alcohol, vinyl acetate, vinyl chloride, styrene, and acrylonitrile.

Examples of the α-olefins having 4 to 12 carbon atoms include 1-butene, 2-methyl-1-propene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methyl ethyl-1-butene, 1-octene, methyl-1-pentene, ethyl-1-hexene, dimethyl-1-hexene, propyl-1-heptene, methyl ethyl-1-heptene, trimethyl-1-pentene, propyl-1-pentene, diethyl-1-butene, 1-nonene, 1-decene, 1-undecene and 1-dodecene.

Examples of the polyolefin resin include vinyl resins such as a polyethylene resin, a polypropylene resin, a polyisobutylene resin, a polyisobutene resin, a polyisoprene resin, a polybutadiene resin, a (meth)acrylic resin (so-called allyl resin), and a polyvinyl chloride resin, a poly(meth)acrylamide resin, a polystyrene resin, an acrylonitrile/butadiene/styrene copolymer resin (ABS resin), an ethylene/(meth)acrylate copolymer, and an ethylene/vinyl acetate copolymer.

Among these resins, a polyethylene resin, a polypropylene resin, an acrylonitrile/butadiene/styrene copolymer resin (ABS resin) are preferable, more preferably a polyethylene resin and a polypropylene resin.

Examples of the polyethylene resin include an ethylene homopolymer and an ethylene-α-olefin copolymer. As the α-olefin, 1-butene, 1-pentene, 1-hexene, and 1-octene are preferable.

Examples of the ethylene-α-olefin copolymer include an ethylene-1-butene copolymer, an ethylene-1-pentene copolymer, an ethylene-1-hexene copolymer, and an ethylene-1-octene copolymer.

When the polyethylene resin is classified according to the density or the shape, polyethylene may be any of high density polyethylene (HDPE), low density polyethylene (LDPE), very low density polyethylene (VLDPE), linear low density polyethylene (LLDPE), and ultra high molecular weight-polyethylene (UHMW-PE).

Examples of the polypropylene resin include a propylene homopolymer, a propylene-ethylene random copolymer, a propylene-α-olefin random copolymer, a propylene-ethylene-α-olefin copolymer, and a propylene block copolymer (copolymer obtained by copolymerizing: a propylene homopolymer component or a copolymer component mainly having a constitutional unit of propylene; at least one of monomers selected from ethylene and α-olefins; and propylene). These polypropylene resins may be used singly, or two or more thereof may be used together.

As the α-olefin to be used for the polypropylene resin, 1-butene, 1-pentene, 1-hexene, 4-methyl-1-pentene, 1-octene, 1-decene are preferable, more preferably 1-butene, 1-hexene, and 1-octene.

Examples of the propylene-α-olefin random copolymer include a propylene-1-butene random copolymer, a propylene-1-hexene random copolymer, and a propylene-1-octene random copolymer.

Examples of the propylene-ethylene-α-olefin copolymer include a propylene-ethylene-1-butene copolymer, a propylene-ethylene-1-hexene copolymer, and a propylene-ethylene-1-octene copolymer.

Examples of the propylene block copolymer include a (propylene)-(propylene-ethylene) copolymer, (propylene)-(propylene-ethylene-1-butene) copolymer, (propylene)-(propylene-ethylene-1-hexene) copolymer, (propylene)-(propylene-1-butene) copolymer, (propylene)-(propylene-1-hexene) copolymer, (propylene-ethylene)-(propylene-ethylene) copolymer, (propylene-ethylene)-(propylene-ethylene-1-butene) copolymer, (propylene-ethylene)-(propylene-ethylene-1-hexene) copolymer, (propylene-ethylene)-(propylene-1-butene) copolymer, (propylene-ethylene)-(propylene-1-hexene) copolymer, (propylene-1-butene)-(propylene-ethylene) copolymer, (propylene-1-butene)-(propylene-ethylene-1-butene) copolymer, (propylene-1-butene)-(propylene-ethylene-1-hexene) copolymer, a (propylene-1-butene)-(propylene-1-butene) copolymer, and a (propylene-1-butene)-(propylene-1-hexene) copolymer.

Among these polypropylene resins, a propylene homopolymer, a propylene-ethylene random copolymer, a propylene-1-butene random copolymer, a propylene-ethylene-1-butene copolymer and a propylene block copolymer are preferable.

The crystallinity of a polypropylene resin can be determined from the melting temperature (melting point) or stereoregularity, and is adjusted according to the product quality required in the polyolefin resin composition of the present disclosure or the product quality required in a molded article obtained by molding the polyolefin resin composition of the present disclosure. It is to be noted that the stereoregularity is called an isotactic index or a syndiotactic index.

The isotactic index is determined by the $^{13}$C-NMR method described in Macromolecules, vol. 8, p. 687 (1975). Specifically, the isotactic index of a polypropylene resin is determined as an area fraction of an mmmm peak in all the absorption peaks in the carbon region of a methyl group in a $^{13}$C-NMR spectrum. A polypropylene resin having a high isotactic index has a high crystallinity, and it is preferable that the isotactic index be 0.96 or more, more preferably 0.97 or more, and still more preferably 0.98 or more.

The syndiotactic index is determined by the method described in J. Am. Chem. Soc., 110, 6255 (1988) or Angew. Chem. Int. Ed. Engl., 1955, 34, 1143-1170, and a polypropylene resin having a high syndiotactic index has a high crystallinity.

Examples of the vinyl resin include vinyl chloride resins [such as homopolymers of a vinyl chloride monomer (such as a polyvinyl chloride resin) and copolymers of a vinyl chloride monomer and another monomer (such as a vinyl chloride-vinyl acetate copolymer and a vinyl chloride-(meth)acrylate copolymer)], vinyl alcohol resins (including homopolymers such as polyvinyl alcohol, copolymers such as an ethylene-vinyl alcohol copolymer, and the like), and polyvinyl acetal resins such as polyvinyl formal. These vinyl resins can be used singly, or two or more thereof can be used in combination.

The melt flow rate (MFR) of the polyolefin resin is usually 0.01 to 400 g/10 min and is preferably 0.1 to 400 g/10 min, more preferably 0.5 to 200 g/10 min from the viewpoint of enhancing mechanical strength and production stability. It is to be noted that the MFR refers to the mass (g/10 min) of a polymer that flows out per 10 minutes at 190° C. under a load of 2.16 kg in accordance with JIS K 7210, unless otherwise noted.

[Resin Having in Polymer Molecule Group Containing Partial Structure of Acid Anhydride]

In a polymer molecule, namely in a molecular chain, the group containing a partial structure of an acid anhydride refers to a group obtained by replacing at least one of hydrogen atoms in the acid anhydride by a bond (—). The acid anhydride may be a chain acid anhydride or a cyclic acid anhydride. The acid anhydride may also be a mixed acid anhydride. In the present disclosure, the group is incorporated in the molecular chain of the polymer through a chemical bond. In the case where the group containing a partial structure of an acid anhydride is a group obtained by replacing one of the hydrogen atoms in the acid anhydride by a bond (—), a group represented by the following formula (Aanh-1) is preferable.

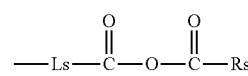

Formula (Aanh-1)

In formula (Aanh-1), Ls represents a single bond or a linking group, Rs represents a hydrogen atom, an alkyl group, an alkenyl group, an alkynyl group, a cycloalkyl group, a cycloalkenyl group, an aryl group, or a heterocyclic group. Rs and Ls herein are optionally bonded to each other to form a ring.

It is preferable that the linking group in Ls be an alkylene group, an alkenylene group, an alkynylene group, a cycloalkylene group, a cycloalkenylene group, an arylene group, a divalent heterocyclic group, —C(=O)—, —O—, —S—, —SO$_2$—, —SO—, —N(Rsa)-, or a group obtained by combining these groups. Rsa herein represents a hydrogen atom or a substituent.

It is preferable that the carbon numbers of the alkylene group be 1 to 12, more preferably 1 to 8, and still more preferably 1 to 4. Examples include methylene, ethylene, isopropylene, trimethylene, tetramethylene, and hexamethylene. The alkylene group optionally has a substituent, and examples of the substituent include the substituents in Ra which will be described later.

It is preferable that the carbon numbers of the alkenylene group be 2 to 12, more preferably 2 to 8, and still more preferably 2 to 4. Examples include vinylene, propynylene, and 4-propyl-2-pentenylene. The alkenylene group optionally has a substituent, and examples of the substituent include the substituents in Ra which will be described later.

It is preferable that the carbon numbers of the alkynylene group be 2 to 12, more preferably 2 to 8, and still more preferably 2 to 4. Examples include ethynylene, ethynylenemethylene, and methylene-ethynylene-methylene. The alkynylene group optionally has a substituent, and examples of the substituent include the substituents in Ra which will be described later.

It is preferable that the carbon numbers of the cycloalkylene group be 3 to 12, more preferably 3 to 8. It is preferable that the number of ring members of the cycloalkylene group be 3 to 7, more preferably 3, 5, or 6, and still more preferably 5 or 6. Examples include cyclopropylene, cyclopentylene, and cyclohexylene. The cycloalkylene group optionally has a substituent, and examples of the substituent include the substituents in Ra which will be described later.

It is preferable that the carbon numbers of the cycloalkenylene group be 5 to 12, more preferably 5 to 8. It is preferable that the number of ring members of the cycloalkenylene group be 5 to 7, more preferably 5 or 6. Examples include cyclopentenylene, and cyclohexenylene. The cycloalkenylene group optionally has a substituent, and examples of the substituent include the substituents in Ra which will be described later.

It is preferable that the carbon numbers of the arylene group be 6 to 12, more preferably 6 to 8. Examples include phenylene and naphthylene. The arylene group optionally has a substituent, and examples of the substituent include the substituents Ra which will be described later.

It is preferable that the carbon numbers of the divalent heterocyclic group be 0 to 12, more preferably 1 to 8. The divalent heterocyclic group has the same number of ring members as the divalent heterocyclic group in Ra which will be described later, and the hetero ring of the heterocyclic group is the same as the hetero ring of the heterocyclic group in Ra which will be described later, and preferred ranges thereof are also the same. The divalent heterocyclic group optionally has a substituent, and examples of the substituent include the substituents in Ra which will be described later.

Examples of the substituent in Rsa include the substituents in Ra which will be described later. It is preferable that Rsa be a hydrogen atom, an alkyl group, an alkenyl group, a cycloalkyl group, a cycloalkenyl group, an aryl group, or a heterocyclic group.

Examples of the group obtained by combining an alkylene group, an alkenylene group, an alkynylene group, a cycloalkylene group, a cycloalkenylene group, an arylene group, a divalent heterocyclic group, —C(=O)—, —O—, —S—, —SO$_2$—, —SO—, and —N(Rsa)- include —O—C(=O)—, —C(=O)—O—, —N(Rsa)-C(=O)—, —C(=O)—N(Rsa)-, —N(Rsa)-SO$_2$—, —SO$_2$—N(Rsa)-, alkylene-O—, —O-alkylene, alkylene-O-alkylene, alkylene-S—, —S-alkylene, alkylene-S-alkylene, arylene-alkylene, alkylene-arylene, —O-arylene, and arylene-O—.

It is preferable that the carbon numbers of the alkyl group in Rs be 1 to 12, more preferably 1 to 8, and still more preferably 1 to 4. Examples include methyl, ethyl, isopropyl, n-propyl, n-butyl, t-butyl, n-pentyl, n-hexyl, n-octyl, 2-ethylhexyl, and n-dodecyl. The alkyl group in Rs optionally has a substituent, and examples of the substituent include the substituents in Ra which will be described later.

It is preferable that the carbon numbers of the alkenyl group in Rs be 2 to 12, more preferably 2 to 8, and still more preferably 2 to 4. Examples include vinyl, allyl, 2-butenyl, 1,3-butadienyl, and 2-pentenyl. The alkenyl group in Rs optionally has a substituent, and examples of the substituent include the substituents in Ra which will be described later.

It is preferable that the carbon numbers of the alkynyl group in Rs be 2 to 12, more preferably 2 to 8, and still more preferably 2 to 4. Examples include ethynyl, 2-propynyl, and 2-penten-4-ynyl. The alkynyl group in Rs optionally has a substituent, and examples of the substituent include the substituents in Ra which will be described later.

It is preferable that the carbon numbers of the cycloalkyl group in Rs be 3 to 12, more preferably 3 to 8. It is preferable that the number of ring members of the cycloalkyl group be 3 to 7, more preferably 3, 5, or 6, and still more preferably 5 or 6. Examples include cyclopropyl, cyclopentyl, and cyclohexyl. The cycloalkyl group in Rs optionally has a substituent, and examples of the substituent include the substituents in Ra which will be described later.

It is preferable that the carbon numbers of the cycloalkenyl group in Rs be 5 to 12, more preferably 5 to 8. It is preferable that the number of ring members of the cycloalkenyl group be 5 to 7, more preferably 5 or 6. Examples include cyclopentenyl and cyclohexenyl. The cycloalkenyl group in Rs optionally has a substituent, and examples of the substituent include the substituents in Ra which will be described later.

It is preferable that the carbon numbers of the aryl group in Rs be 6 to 12, more preferably 6 to 8. Examples include phenyl and naphthyl. The aryl group in Rs optionally has a substituent, and examples of the substituent include the substituents in Ra which will be described later.

It is preferable that the carbon numbers of the heterocyclic group be 0 to 12, more preferably 1 to 8. The heterocyclic group has the same number of ring members as the heterocyclic group in Ra which will be described later, and the hetero ring of the heterocyclic group is the same as the hetero ring of the heterocyclic group in Ra which will be described later, and preferred ranges thereof are also the same. The heterocyclic group in Rs optionally has a substituent, and examples of the substituent include the substituents in Ra which will be described later.

The ring to be formed in such a way that Rs and Ls are bonded to each other may be any of a saturated carbon ring, an unsaturated carbon ring, an aromatic carbon ring, and a hetero ring. In addition, it is preferable that the number of ring members of the ring to be formed be 3 to 7, more preferably 5 or 6, and particularly preferably 5. Examples of the ring to be formed in such a way that Rs and Ls are bonded to each other include a 2,5-dioxotetrahydrofuran ring (maleic anhydride ring), a 2,5-dioxobenzotetrahydrofuran ring (phthalic anhydride ring), a 2,6-dioxotetrahydropyrane ring, a 2,6-dioxo-1,4-dioxane ring, a 2,6-dioxomorpholine ring, and a 2,6-dioxothiomorpholine ring. The ring to be formed optionally has a substituent, and examples of the substituent include the substituent in Ra which will be described later.

The group represented by formula (Aanh-1) is a monovalent group and exists in a side chain or an end of a polymer. The side chain of the polymer herein means bonding to an atom forming the main chain of the polymer.

In the present disclosure, a case where Rs and Ls are bonded to each other to form a ring is preferable, and in this case, a case where a ring-forming atom in the formed ring and an atom forming the main chain of the polymer are directly bonded is most preferable.

A case where the group containing a partial structure of an acid anhydride in a polymer molecule is a group obtained by replacing at least two hydrogen atoms of the acid anhydride by two bonds (—) is also preferable. In the case of the group obtained by replacing at least two hydrogen atoms of the acid anhydride by two bonds (—), it is preferable that the group be incorporated as a ring of the acid anhydride or an atom forming the main chain of the polymer. Among others, it is preferable that the group be incorporated as a unit represented by the following formula (Aanh-2) in the polymer main chain.

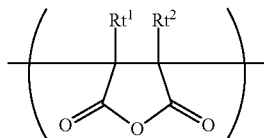

Formula (Aanh-2)

In formula (Aanh-2), $Rt^1$ and $Rt^2$ each independently represent a hydrogen atom or a substituent. $Rt^1$ and $Rt^2$ herein are optionally bonded to each other to form a ring.

Examples of the substituent in $Rt^1$ and $Rt^2$ include substituents given as examples in Ra which will be described later. It is preferable that $Rt^1$ and $Rt^2$ each be a hydrogen atom, an alkyl group, a cycloalkyl group, an aryl group, or a heterocyclic group, more preferably a hydrogen atom, an alkyl group, or an aryl group, and still more preferably a hydrogen atom or an alkyl group.

The alkyl group, cycloalkyl group, aryl group, and heterocyclic group in $Rt^1$ and $Rt^2$ are as defined for the alkyl group, cycloalkyl group, aryl group, and heterocyclic group in Rs, and preferred ranges thereof are also the same. In addition, these optionally have a substituent, and examples of the substituent include the substituents in Ra which will be described later.

It is preferable that the ring to be formed in such a way that $Rt^1$ and $Rt^2$ are bonded to each other be a 5- or 7-membered ring, more preferably a 5- or 6-membered ring. In addition, a carbon ring is preferable, more preferably a cyclopentane ring or a cyclohexane ring among others.

It is preferable that the resin having in a polymer molecule a group containing a partial structure of an acid anhydride be a so-called unsaturated carboxylic anhydride-modified resin, which is acid-modified with an unsaturated carboxylic anhydride. It is preferable that an unsaturated carboxylic anhydride-modified thermoplastic resin be an unsaturated carboxylic anhydride-modified resin of the above-described base resin, namely a resin obtained by modifying the above-described base resin with an unsaturated carboxylic anhydride, more preferably an unsaturated carboxylic anhydride-modified polyolefin resin obtained by modifying the above-described polyolefin resin with an unsaturated carboxylic anhydride.

The modification with an unsaturated carboxylic anhydride may be graft modification, or may be incorporated as a repeating unit in the polymer chain. It is to be noted that products produced in such a way that part of the unsaturated carboxylic anhydride is hydrolyzed at a stage of modification, namely a stage of synthesis, may be contained.

Examples of a cyclic acid anhydride among the unsaturated carboxylic anhydrides include acid anhydrides having a maleic acid skeleton, such as maleic anhydride, citraconic anhydride (methylmaleic anhydride), 2,3-dimethylmaleic anhydride, 2-(2-carboxyethyl)-3-methylmaleic anhydride, 2-cyclohexene-1,2-dicarboxylic anhydride, phenylmaleic anhydride, 2,3-diphenylmaleic anhydride, 5,6-dihydro-1,4-dithiin-2,3-dicarboxylic anhydride, and 2,3-bis(2,4,5-trimethyl-3-thienyl)maleic anhydride, and acid anhydrides having a phthalic acid skeleton, such as 4-ethynylphthalic anhydride, 4,4'-(ethin-1,2-diyl)diphthalic anhydride, 4-(1-propynyl)phthalic anhydride, and 4-phenylethynylphthalic anhydride.

Examples of a chain acid anhydride among the unsaturated carboxylic anhydrides include an acid anhydride of fumaric acid, itaconic acid, acrylic acid, or methacrylic acid, and mixed acid anhydrides of these unsaturated carboxylic acids with a saturated aliphatic carboxylic acid, an aromatic carboxylic acid, or a heterocyclic carboxylic acid.

In the present disclosure, a cyclic unsaturated carboxylic anhydride is preferable, more preferably an acid anhydride having a maleic acid skeleton, and particularly preferably maleic anhydride.

It is preferable that the maleic anhydride-modified polyolefin be maleic anhydride-modified polyethylene, maleic anhydride-modified polypropylene, or maleic anhydride-modified polystyrene, and the maleic anhydride-modified polyolefin is more preferably maleic anhydride-modified polyethylene or maleic anhydride-modified polypropylene. It is to be noted that a maleic anhydride-modified copolymer of a copolymer of two selected from ethylene, propylene, and styrene is also preferable.

Examples of the maleic anhydride-modified polyethylene and the maleic anhydride-modified polypropylene include an ethylene-propylene copolymer modified with maleic anhydride, ethylene-α-olefin copolymers (such as an ethylene-vinyl acetate copolymer, an ethylene-hexene copolymer, and an ethylene-octene copolymer) modified with maleic anhydride, and styrene/ethylene/butylene/styrene (SEBS) having a group containing maleic anhydride. In addition, the maleic anhydride-modified polyethylene and the maleic anhydride-modified polypropylene may contain not only maleic anhydride but also a polar group (an alkylene glycol-based or (meth)acrylic acid-based monomer component) as a polar group to be grafted or copolymerized. Among these, particularly preferred maleic anhydride-modified polyethylene and maleic anhydride-modified polypropylene are maleic anhydride-modified polyolefins (polyethylene, polypropylene, polystyrene, or copolymers thereof), an ethylene-propylene copolymer modified with maleic anhydride, ethylene-α-olefin copolymers (such as an ethylene-vinyl acetate copolymer, an ethylene-hexene copolymer, and an ethylene-octene copolymer) modified with maleic anhydride, and styrene/ethylene/butylene/styrene (SEBS) having a group containing maleic anhydride.

The method of modifying (method of synthesizing) the unsaturated carboxylic anhydride herein is not particularly limited. The method may be graft extrusion or graft polymerization in a solution system, and styrene may be contained as a comonomer. The polar group may be introduced through a synthesis step using a copolymerization reaction.

It is preferable that the content of the resin having in a polymer molecule a group containing a partial structure of an acid anhydride be 1 to 50% by mass, more preferably 2 to 30% by mass, and still more preferably 5 to 20% by mass in the thermoplastic resins.

—C(=O)—O—C(=O)— in the acid anhydride structure has a high polarity and a strong hydrophilicity, and is excellent in tight adhesion to a surface of a polymer molecule having hydrophilicity due to dipole-dipole interaction and hydrogen bonding interaction with the polymer molecular having hydrophilicity as well. In addition, especially when a hydroxy group (—OH) exists on the hydrophilic surface of the polymer molecule having hydrophilicity, —C(=O)—O—C(=O)— in the acid anhydride structure partially forms a covalent bond by an ester reaction to exhibit a stronger tight-adhesion. In the present disclosure, with respect to the cellulose fiber, it is considered that the surface of the fiber is hydrophilic, and therefore the resin having in a polymer molecule a group containing a partial structure of an acid anhydride acts on the surface of the fiber to improve the tight adhesion between matrix resins (thermoplastic resins including the base resin) and the cellulose. Occurrence of this phenomenon acts in such a way as to increase the viscosity of the thermoplastic resins as a whole. When consideration is made applying this to the equation (1.1) for the stress (Fh) which the cellulose feels in the shear field and the equation (1.2) relating to the equation (1.1), the equations described in the thermoplastic resins, the occurrence of the phenomenon acts in such a way as to make the force which the cellulose feels in the shear field large. That is, when the resin having in a polymer molecule a group containing a partial structure of an acid anhydride is contained, the force applied to the cellulose in the shear field can thereby be strengthened. It is inferred that the micronization of the cellulose is thereby facilitated, and as a result, the apparent modulus of elasticity of the cellulose is improved.

(Apparent Modulus of Elasticity of Cellulose Contained in Thermoplastic Resin Composition)

In the present disclosure, it is preferable that the apparent modulus of elasticity ($Ef_1$) of the cellulose contained in the thermoplastic resin composition be equal to or larger than 1.1 times the apparent modulus of elasticity ($Ef_0$) of the cellulose contained in a thermoplastic resin composition not containing a resin having in a polymer molecule a group containing an acid anhydride, or the apparent modulus of elasticity ($Ef_1$) of the cellulose contained in the thermoplastic resin composition be equal to or larger than 1.1 times the apparent modulus of elasticity ($Ef_0$) of the cellulose contained in a thermoplastic resin composition not containing an ionic compound. It is preferable that this ratio ($Ef_1/Ef_0$) be higher, and this ratio is preferably 1.2 times or larger, still more preferably 1.3 times or larger, particularly preferably 1.4 times or larger, and most preferably 1.5 times or larger. In addition, the upper limit is realistically 15 times or smaller.

It is to be noted that the apparent modulus of elasticity of the cellulose contained in the thermoplastic resin composition can be measured in the following manner.

A test specimen for a flexure test (for example, 4 mm in thickness×80 mm in length) is prepared using a cellulose-reinforced thermoplastic resin composition by injection molding or the like. With respect to injection conditions, the injection molding can be carried out under molding conditions which are generally regarded as suitable. The modulus of elasticity in flexure is calculated following JIS K 7171. The density is determined in accordance with JIS K 7112, but ethanol is used as a solvent for measurement instead of water. The volume fraction of each component of the resins and the cellulose is calculated from the obtained density. The density and modulus of elasticity of only the resins herein are separately calculated by JIS K 7112 and JIS K 7171. The apparent modulus of elasticity Ef of the cellulose can be determined from an equation (2.2) obtained by transforming the following equation (2.1). It is to be noted that Em is usually determined by the following equation (3.1) when a matrix resin is a single system or regarded substantially as a single system. In the present disclosure, at least two matrix resins exist, and therefore Em is determined from the following equation (4.1) based on the compound rule assuming an equation (4.2). This modulus of elasticity is defined as $Ef_1$.

$$Ec = EmVm + EfVf \quad (2.1)$$

$$Ef = \{Ec - Em(1 - Vf)\}/Vf \quad (2.2)$$

Ec herein represents Young's modulus (modulus of elasticity) of the test specimen for a flexure test, which is a composite material, Em represents Young's modulus (modulus of elasticity) of the thermoplastic resins which are mother materials, and Ef represents Young's modulus (modulus of elasticity) of the cellulose which is a fiber. Vm represents a volume ratio of the thermoplastic resins which are mother materials, and Vf represents a volume ratio of the cellulose which is a fiber. These volume ratios are determined from the density. On the other hand, when the matrix resin is a single system or regarded substantially as a single system, the volume ratio of the composite material is one, and therefore these volume ratios are determined by the following equation (3.1).

$$Vm = 1 - Vf \quad (3.1)$$

When the matrix resin is not regarded as a single system (When the matrix resin is a mixture of two or more resins and is considered to give a significant influence on the modulus of elasticity in view of the amount of each resin mixed), the modulus of elasticity of each component is specified from the following equation (4.1) assuming that each component follows the compound rule in the matrix resin, and the apparent modulus of elasticity of the cellulose is finally determined by the equation (2.2). The sum total of Vp of each component herein is equal to one, that is, the following equation (4.2) is satisfied.

$$Em = \sum_{p=1}^{n} EpVp \quad (4.1)$$

$$\sum_{p=1}^{n} V_p = 1 \quad (4.2)$$

Regarding each component herein, Ep represents Young's modulus (modulus of elasticity) of a component p, Vp represents a volume ratio of a component p and is determined from the density. It is to be noted that 1 to n components exist, and n represents the maximum value of the number of existing components.

On the other hand, the apparent modulus of elasticity Ef of the cellulose in a thermoplastic resin composition obtained by removing the acid-modified thermoplastic resin and the ionic compound (when only one of the two exists, removing the acid-modified thermoplastic resin or ionic compound that exists) from the above-described thermoplastic resin composition is determined in the same manner. The modulus of elasticity in this case is defined as $Ef_0$. The ratio of $Ef_1$ to $Ef_0$ ($Ef_1/Ef_0$) is determined based on each modulus of elasticity, $Ef_1$ and $Ef_0$, obtained above.

<Cellulose>

It is preferable that the cellulose to be used in the present disclosure be plant-derived fibrous cellulose, especially plant-derived, micro-fibrous cellulose. In the molded article of the present disclosure, such as, for example, a lamp body of a lighting appliance, a speaker unit, a connection box, a connector, a pulley, and a film for a house, the cellulose is used as a compounding material for a resin part, and therefore, weight reduction and high strengthening can be achieved. In addition, recyclability of the molded article can also be improved. Further, for example, when the embodiment of the molded article is like a film, a film for a house, as a molded article, can possess an improved surface smoothness by including a layer of the thermoplastic resins in which such fibrous cellulose is composited, and a film for a house possessing an excellent light permeability can thereby be obtained. In addition, cellulose is a polar molecule having an —OH group, and the affinity between molecules is therefore high. Thus, a film for a house excellent in adhesion performance can be obtained because the interfacial adhesive force of the film for a house is improved. Thereby, an advantageous point, such as, for example, that the film for a house, when broken, can simply be repaired with an adhesive tape or the like, is obtained.

Pulp is a raw material for paper and contains as the main component a tracheid which is extracted from a plant. From the chemical viewpoint, the main component of pulp is a polysaccharide, and the main component of the polysaccharide is cellulose. The plant-derived fibrous cellulose is not particularly limited, and examples thereof include plant-derived cellulose such as wood, bamboo, hemp, jute, kenaf, harvest losses of farm products (for example, straw of wheat, rice, or the like, maize, stems of raw cotton or the like, sugarcane), cloth, regenerated pulp, and old paper; however, in the present disclosure, wood or wood-derived fibrous cellulose is preferable, and the plant-derived fibrous cellulose is particularly preferably craft pulp. It is to be noted that the craft pulp is a general term of pulp obtained by removing lignin/hemicellulose from wood or a plant raw material by a chemical treatment with caustic soda or the like to take out cellulose that is almost pure.

The present disclosure realizes micronization of cellulose by kneading such cellulose in the thermoplastic resins.

In the plant-derived fibrous cellulose, 30 to 40 molecules make a bundle and form a microfibril having an ultrathin width of a diameter of about 3 nm and a length of several hundred nm to several tens μm and having a high crystallinity, and such microfibrils form a structure in which these are made into a bundle through soft amorphous portions. Powdered cellulose to be used as a raw material in the present disclosure is an aggregate of these bundles. It is to be noted that the molecular chain of cellulose forming a microfibril is an extended chain crystal, and the microfibril thereby has an extremely high modulus of elasticity, and it is said that the microfibril ideally has a modulus of elasticity of about 140 GPa. In addition, it is known that the modulus of elasticity of cellulose increases as the wire diameter gets smaller. Accordingly, to improve the performance as a reinforced resin, it is more effective when the diameter of the cellulose dispersed in the thermoplastic resins is made thinner and is micronized more.

In the present disclosure, it is preferable that the micronized cellulose be cellulose of rod-like fiber. The embodiment of the rod-like fiber is not particularly limited, and examples thereof include a straight fiber and a bent fiber. It is preferable that the length of the short side (diameter) of the cellulose be 2 μm or less, more preferably 3 nm to 2 μm, still more preferably 3 nm to 1 μm, further still more preferably 3 nm to 0.5 μm, and particularly preferably 4 to 300 nm. On the other hand, it is preferable that the length of the long side (length) be 0.03 to 500 μm, more preferably 0.05 to 200 μm. It is preferable that the aspect ratio be 5 or more, more preferably 10 to 1000. It is to be noted that the aspect ratio refers to a value obtained by dividing the average length by the average fiber diameter.

Further, in the present disclosure, it is preferable that the micronized cellulose be such that 15% or more of the cellulose contained has a short side length of 2 μm or less. The content of the cellulose fiber having a short side length of 2 μm or less is more preferably 20% or more, still more preferably 25% or more.

In the present disclosure, it is preferable that the content of the cellulose be 1 to 100 parts by mass, more preferably 5 to 70 parts by mass, and still more preferably 10 to 50 parts by mass based on 100 parts by mass of the thermoplastic resins. When the content of the cellulose is less than 1 part by mass, transmission of force to the cellulose does not occur effectively during kneading, making it substantially difficult to obtain micronized cellulose. Conversely, when the content of the cellulose exceeds 100 parts by mass, satisfactorily dispersing the cellulose in the thermoplastic resins is made difficult, so that satisfactory characteristics to use the cellulose as a material cannot be obtained.

<Ionic Compound>

The thermoplastic resin composition of the present disclosure may contain an ionic compound together with the cellulose. It is preferable that the ionic compound to be used in the present disclosure be an ionic compound generally called an ionic liquid. The ionic liquid is a salt existing as a liquid in a wide temperature range and is a liquid composed of ions only. Generally, a salt having a melting point of 100° C. or less is defined as an ionic liquid (IL), and an ionic liquid having a melting point at around room temperature is called "RTIL (room temperature IL)".

It is preferable that the ionic liquid to be used in the present disclosure be an ionic compound generally called an ionic liquid, but the melting point may exceed 100° C., for example, 150° C. or more. That is, in the present disclosure, the cellulose is micronized by kneading the cellulose in a processing machine at a stage where a cellulose-reinforced resin or a cellulose-reinforced resin composition is processed and molded by extrusion, injection, or the like, and therefore the temperature in a processing step and in a processing machine can be set to the melting point of the ionic compound or higher. Accordingly, for example, even if the melting point of the ionic compound is 180° C., processing is performed at a temperature higher than 180° C., for example, at 190° C., and thereby the same action as the action of a so-called ionic liquid can be expected.

In the present disclosure, it is preferable that the ionic compound be an organic, ionic compound, an onium salt, such as a quaternary phosphonium salt or a quaternary ammonium salt, and among these, it is preferable that the ionic compound be a compound represented by the following formula (1) or (2).

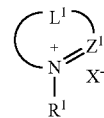

Formula (1)

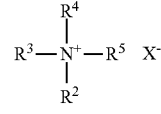

Formula (2)

In the formulas (1) and (2), $Z^1$ represents =C(Ra)— or =N—, wherein Ra represents a hydrogen atom or a substituent. $L^1$ represents a divalent linking group. $R^1$ to $R^5$ each independently represent an alkyl group, an alkenyl group, a cycloalkyl group, an aryl group, or a heterocyclic group. At least two of $R^2$ to $R^5$ are optionally bonded to each other to form a ring. $X^-$ represents an anion.

$Z^1$ represents =C(Ra)— or =N—, and =C(Ra)— is preferable.

Examples of the substituent in Ra include an alkyl group, an alkenyl group, a cycloalkyl group, an aryl group, a heterocyclic group, an alkoxy group, an aryloxy group, an alkylthio group, an arylthio group, an amino group, an acyl group, an acylamino group, a sulfonamide group, a carbamoyl group, a sulfamoyl group, an alkoxycarbonyl group, an aryloxycarbonyl group, an acyloxy group, a sulfonyl group, a halogen atom, a hydroxy group, a carboxy group, and a sulfo group.

It is preferable that the carbon numbers of the alkyl group be 1 to 20, more preferably 1 to 12, and still more preferably 1 to 8. Examples of the alkyl group include methyl, ethyl, n-propyl, isopropyl, n-butyl, isobutyl, t-butyl, n-pentyl, t-pentyl, n-hexyl, n-pentyl, n-octyl, 2-ethylhexyl, n-octyl, n-decyl, n-dodecyl, n-hexadecyl, and n-octadecyl. The alkyl group optionally has a substituent, and examples of the substituent include the substituents given as examples in Ra.

It is preferable that the carbon numbers of the alkenyl group be 2 to 20, more preferably 2 to 12, and still more preferably 2 to 8. Examples of the alkenyl group include vinyl, allyl, and oleyl. The alkenyl group optionally has a substituent, and examples of the substituent include the substituents given as examples in Ra.

It is preferable that the cycloalkyl group be a cycloalkyl group of a 3- to 7-membered ring, more preferably a cycloalkyl group of a 3-, 5-, 6-, or 7-membered ring, and still more preferably a cycloalkyl group of a 5- or 6-membered ring. It is preferable that the carbon numbers of the cycloalkyl group be 3 to 20, more preferably 3 to 12, still more preferably 5 to 12, and particularly preferably 5 to 8. Examples of the cycloalkyl group include cyclopropyl, cyclopentyl, and cyclohexyl. The cycloalkyl group optionally has a substituent, and examples of the substituent include the substituents given as examples in Ra.

It is preferable that the carbon numbers of the aryl group be 6 to 20, more preferably 6 to 12, and still more preferably 6 to 8. Examples of the aryl group include phenyl and naphthyl. The aryl group optionally has a substituent, and examples of the substituent include the substituents given as examples in Ra.

With respect to the hetero ring of the heterocyclic group, the hetero atom forming the hetero ring is selected from an oxygen atom, a sulfur atom, and a nitrogen atom, and a hetero ring of a 5- or 7-membered ring is preferable. In addition, the hetero ring may be an aromatic ring, an unsaturated ring, or a saturated ring. It is preferable that the carbon numbers of the heterocyclic group be 0 to 20, more preferably 1 to 12, and still more preferably 1 to 8. Examples of the hetero ring of the heterocyclic group include a furan ring, a thiophene ring, a pyrrole ring, an imidazole ring, a pyrazole ring, a triazole ring, a tetrazole ring, an oxazole ring, a thiazole ring, a pyridine ring, a pyrazine ring, a pyrimidine ring, a pyridazine ring, a triazine ring, an indoline ring, a tetrahydrofuran ring, a tetrahydrothiophene ring, a pyrrolidine ring, an imidazolidine ring, an imidazoline ring, a pyrazodine ring, a piperidine ring, a piperazine ring, a morpholine ring, a thiomorpholine ring, a 1,1-dioxothiomorpholine ring, a 1-oxomorpholine ring, a quinuclidine ring, a 1,4-diazabicylo[2,2,2]octane ring, and a cyanuric acid ring. In addition, examples of the hetero ring of the heterocyclic group also include hetero rings whose rings are condensed with a benzene ring or another ring, such as a benzofuran ring, a benzothiophene ring, a benzimidazole ring, a benzopyrazole ring, a benzotriazole ring, a benzoxazole ring, and a benzothiazole ring. The heterocyclic group optionally has a substituent, and examples of the substituent include the substituents given as examples in Ra.

It is preferable that the carbon numbers of the alkoxy group be 1 to 20, more preferably 1 to 12, and still more preferably 1 to 8. Examples of the alkoxy group include methoxy, ethoxy, n-propoxy, isopropoxy, n-butoxy, isobutoxy, t-butoxy, n-pentyloxy, t-pentyloxy, n-hexyloxy, n-pentyloxy, n-octyloxy, 2-ethylhexyloxy, n-octyloxy, n-decyloxy, n-dodecyloxy, n-hexadecyloxy, and n-octadecyloxy. The alkoxy group optionally has a substituent, and examples of the substituent include the substituents given as examples in Ra.

It is preferable that the carbon numbers of the aryloxy group be 6 to 20, more preferably 6 to 12, and still more preferably 6 to 8. Examples of the aryloxy group include phenoxy and naphthoxy. The aryloxy group optionally has a substituent, and examples of the substituent include the substituents given as examples in Ra.

It is preferable that the carbon numbers of the alkylthio group be 1 to 20, more preferably 1 to 12, and still more preferably 1 to 8. Examples of the alkylthio group include methylthio, ethylthio, n-propylthio, isopropylthio, n-butylthio, isobutylthio, t-butylthio, n-pentylthio, t-pentylthio, n-hexylthio, n-pentylthio, n-octylthio, 2-ethylhexylthio, n-octylthio, n-decylthio, n-dodecylthio, n-hexadecyithio, and n-octadecylthio. The alkylthio group optionally has a substituent, and examples of the substituent include the substituents given as examples in Ra.

It is preferable that the carbon numbers of the arylthio group be 6 to 20, more preferably 6 to 12, and still more preferably 6 to 8. Examples of the arylthio group include phenylthio and naphthylthio. The arylthio group optionally has a substituent, and examples of the substituent include the substituents given as examples in Ra.

The amino group includes an amino group, an alkylamino group, an arylamino group, and a heterocyclic amino group, and it is preferable that the carbon numbers of the amino group be 0 to 20, more preferably 0 to 12, still more preferably 1 to 12, and particularly preferably 1 to 8. Examples of the amino group include amino, methylamino, dimethylamino, ethylamino, diethylamino, isopropylamino, di-n-propylamino, 2-ethylhexylamino, n-octylamino, dodecylamino, phenylamino, diphenylamino, and phenylmethylamino. The amino group optionally has a substituent, and examples of the substituent include the substituents given as examples in Ra.

The acyl group includes a formyl group, an alkanoyl group, an acycloalkanoyl group, an alkenoyl group, an aryloyl group, and a heterocyclic carbonyl group. It is preferable that the carbon numbers of the acyl group be 1 to 20, more preferably 2 to 12, and still more preferably 2 to 8. Examples of the acyl group include formyl, acetyl, propionyl, butyryl, valeryl, pivaloyl, lauroyl, palmitoyl, stearoyl, cyclopropylcarbonyl, cyclopentylcarbonyl, cyclohexylcarbonyl, acryloyl, methacryloyl, oleyl, benzoyl, naphthoyl, nicotinoyl, and isonicotinoyl. The acyl group optionally has a substituent, and examples of the substituent include the substituents given as examples in Ra.

Examples of the acylamino group include an amino group in which the nitrogen atom is substituted with the acyl group. It is preferable that the carbon numbers of the acylamino group be 1 to 20, more preferably 2 to 12, and still more preferably 2 to 8. Examples of the acylamino group include formylamino, acetylamino, propionylamino, butyrylamino, valerylamino, pivaloylamino, lauroylamino, palmitoylamino, stearoylamino, cyclopropylcarbonylamino, cyclopentylcarbonylamino, cyclohexylcarbonylamino, acryloylamino, methacryloylamino, oleylamino, bezoylamino, naphthoylamino, nicotinoylamino, and isonicotinoylamino. The acylamino group optionally has a substituent, and examples of the substituent include the substituents given as examples in Ra.

The sulfonamide group includes an alkylsulfonamide group, a cycloalkylsufonamide group, an arylsulfonamide group, and a heterocyclic sulfonamide group. It is preferable that the carbon numbers of the sulfonamide group be 1 to 20, more preferably 2 to 12, and still more preferably 2 to 8. Examples of the sulfonamide group include methanesulfonamide, ethanesulfonamide, propanesulfonamide, octanesulfonamide, cyclopentanesulfonamide, cyclohexanesulfonamide, benzenesulfonamide, and naphthalenesulfonamide. The sulfonamide group optionally has a substituent, and examples of the substituent include the substituents given as examples in Ra.

The carbamoyl group includes a carbamoyl group, an alkylcarbamoyl group, a cycloalkylcarbamoyl group, an arylcarbamoyl group, and a heterocyclic carbamoyl group. It is preferable that the carbon numbers of the carbamoyl group be 1 to 20, more preferably 2 to 12, and still more preferably 2 to 8. Examples of the carbamoyl group include N-methylcarbamoyl, N,N-dimethylcarbamoyl, N-phenylcarbamoyl, N-phenyl-N-methylcarbamoyl, N-cyclohexyl-carbamoyl, N-imidazolylcarbamoyl, pyrrolidinecarbonyl, and piperidinecarbonyl. The carbamoyl group optionally has a substituent, and examples of the substituent include the substituents given as examples in Ra.

The sulfamoyl group includes a sulfamoyl group, an alkylsulfamoyl group, a cycloalkylsulfamoyl group, an arylsulfamoyl group, and a heterocyclic sulfamoyl group. It is preferable that the carbon numbers of the sulfamoyl group be 0 to 20, more preferably 1 to 12, and still more preferably 1 to 8. Examples of the sulfamoyl group include N-methylsulfamoyl, N,N-dimethylsulfamoyl, N-phenylsulfamoyl, N-phenyl-N-methylsulfamoyl, N-cyclohexylsulfamoyl, N-imidazolylsulfamoyl, pyrrolidinesulfamoyl, and piperidinesulfamoyl. The sulfamoyl group optionally has a substituent, and examples of the substituent include the substituents given as examples in Ra.

It is preferable that the carbon numbers of the alkoxycarbonyl group be 2 to 20, more preferably 2 to 12, and still more preferably 2 to 8. Examples of the alkoxycarbonyl group include methoxycarbonyl, ethoxycarbonyl, n-propoxycarbonyl, isopropoxycarbonyl, n-butoxycarbonyl, isobutoxycarbonyl, t-butoxycarbonyl, n-pentyloxycarbonyl, t-pentyloxycarbonyl, n-hexyloxycarbonyl, n-pentyloxycarbonyl, n-octyloxycarbonyl, 2-ethylhexyloxycarbonyl, n-octyloxycarbonyl, n-decyloxycarbonyl, n-dodecyloxycarbonyl, n-hexadecyloxycarbonyl, and n-octadecyloxycarbonyl. The alkoxycarbonyl group optionally has a substituent, and examples of the substituent include the substituents given as examples in Ra.

It is preferable that the carbon numbers of the aryloxycarbonyl group be 7 to 20, more preferably 7 to 12. Examples of the aryloxycarbonyl group include phenoxycarbonyl and napthoxycarbonyl. The aryloxycarbonyl group optionally has a substituent, and examples of the substituent include the substituents given as examples in Ra.

The acyloxy group includes a formyloxy group, an alkanoyloxy group, an acycloalkanoyloxy group, an alkenoyloxyl group, an arloyloxy group, and a heterocyclic carbonyloxy group. It is preferable that the carbon numbers of the acyloxy group be 1 to 20, more preferably 2 to 12, and still more preferably 2 to 8. Examples of the acyloxy group include formyloxy, acetyloxy, propionyloxy, butyryloxy, valeryloxy, pivaloyloxy, lauroyloxy, palmitoyloxy, stearoyloxy, cyclopropylcarbonyloxy, cyclopentylcarbonyloxy, cyclohexylcarbonyloxy, acryloyloxy, methacryloyloxy, oleyloxy, benzoyloxy, naphthoyloxy, nicotinoyloxy, and isonicotinoyloxy. The acyloxy group optionally has a substituent, and examples of the substituent include the substituents given as examples in Ra.

The sulfonyl group includes an alkylsulfonyl group, a cycloalkylsulfonyl group, an arylsulfonyl group, and a heterocyclic sulfonyl group. It is preferable that the carbon numbers of the sulfonyl group be 1 to 20, more preferably 2 to 12, and still more preferably 2 to 8. Examples of the sulfonyl group include methanesulfonyl, ethanesulfonyl, propanesulfonyl, octanesulfonyl, cyclopentanesulfonyl, cyclohexanesulfonyl, benzenesulfonyl, and naphthalenesulfonyl. The sulfonyl group optionally has a substituent, and examples of the substituent include the substituents given as examplesin Ra.

Examples of the halogen atom include a fluorine atom, a chlorine atom, a bromine atom, and an iodine atom.

It is preferable that Ra be a hydrogen atom, an alkyl group, a cycloalkyl group, an aryl group, a heterocyclic group, an alkoxy group, an alkylthio group, or an amino group, more preferably a hydrogen atom, an alkyl group, a cycloalkyl group, or an aryl group, still more preferably a hydrogen atom or an alkyl group, and particularly preferably a hydrogen atom.

$L^1$ represents a divalent linking group, it is preferable that $L^1$ be a linking group that forms a 5- or 6-membered, nitrogen-containing hetero ring together with $—N^+(R^1)=Z^1—$, and $L^1$ is more preferably a linking group that forms a 5- or 6-membered, nitrogen-containing heteroaromatic ring, particularly preferably a 5-membered, nitrogen-containing heteroaromatic ring together with $—N^+(R^1)=Z^1—$. Herein, the above-described nitrogen-containing hetero ring formed is optionally condensed with a benzene ring or another ring or optionally substituted with a substituent. Examples of the substituent include the substituents in Ra.

It is preferable that the divalent linking group in $L^1$ be a linking group such that the linking atom is selected from a carbon atom, an oxygen atom, a sulfur atom, and a nitrogen atom. Examples of the ring formed with the divalent linking group in $L^1$ and $—N^+(R^1)=Z^1—$ include an imidazole ring, a pyrazole ring, a triazole ring, a tetrazole ring, an oxazole ring, a thiazole ring, a pyridine ring, a pyrazine ring, a pyrimidine ring, a pyridazine ring, a triazine ring, a 1-pyrrolidine ring, an imidazoline ring, and condensates thereof with benzene.

The alkyl group, alkenyl group, cycloalkyl group, aryl group, and heterocyclic group in $R^1$ to $R^5$ are as defined for the alkyl group, alkenyl group, cycloalkyl group, aryl group, and heterocyclic group in Ra, and preferred ranges thereof are also the same.

It is preferable that the ring formed in such a way that at least two of $R^2$ to $R^5$ are bonded to each other be a 5- to 7-membered ring, more preferably a 5- or 6-membered ring. In addition, the ring to be formed may be an aromatic ring, an unsaturated ring, or a saturated ring, but it is preferable that the ring to be formed be a saturated ring.

Examples of the ring formed in such a way that at least two of $R^2$ to $R^5$ are bonded to each other include a pyrrolidine ring, a pyrroline ring, a pyrazolidine ring, a pyrazoline ring, a pyrrole ring, a piperidine ring, a piperazine ring, a morpholine ring, a thiomorpholine ring, a 1,1-dioxothiomorpholine ring, and a 1-oxomorpholine ring.

Examples of the ring formed in such a way that three of R² to R⁵ are bonded to each other include a quinuclidine ring and a 1,4-diazabicyclo[2,2,2]octane ring.

Specific examples of the cation (the part other than X⁻) of the compound represented by formula (1) or (2) include the following cations.

1-Alkyl-3-methylimidazoliums such as 1-ethyl-3-methylimidazolium, 1-butyl-3-methylimidazolium, 1-hexyl-3-methylimidazolium, and 1-octyl-3-methylimidazolium, 1,3-dimethylimidazolium, 1,3-diethylimidazolium, 1,2,3-trimethylimidazolium, 1,2,3,4-tetramethylimidazolium, 1,3,4-trimethyl-2-ethylimidazolium, 1,3-dimethyl-2,4-diethylimidazolium, 1,2-dimethyl-3,4-diethylimidazolium, 1-methyl-2,3,4-triethylimidazolium, 1,2,3,4-tetraethylimidazolium, 1,3-dimethyl-2-ethylimidazolium, 1-ethyl-2,3-dimethylimidazolium, 1,2,3-triethylimidazolium1-ethyl-2,3-dimethylimidazolium, 1-propyl-2,3-dimethylimidazolium, 1-butyl-2,3-dimethylimidazolium, 1-pentyl-2,3-dimethylimidazolium, 1-hexyl-2,3-dimethylimidazolium, 1-heptyl-2,3-dimethylimidazolium, 1-octyl-2,3-dimethylimidazolium1-cyanomethyl-3-methylimidazolium, 1-(2-hydroxyethyl)-3-methylimidazolium, 1-allyl-3-methylimidazolium, 1-butylpyridinium, 1-hexylpyridinium, N-(3-hydroxypropyl)pyridinium, N-hexyl-4-dimethylaminopyridinium, N-(methoxyethyl)-N-methylmorpholium, 1-(2-methoxyethyl)-1-methylpyrrolidinium, 1-(methoxyethyl)-1-methylpiperidinium, N-(methoxyethyl)-1-methylpyrrolidinium, 1,2-dimethylpyrazolium, N-(methoxyethyl)-2-methyloxazolium, N-(methoxyethyl)-2-methylthiazolium, 1,2,3-trimethylimidazolinium, 1,2,3,4-tetramethylimidazolinium, 1,3,4-trimethyl-2-ethylimidazolinium, 1,3-dimethyl-2,4-diethylimidazolinium, 1,2-dimethyl-3,4-diethylimidazolinium, 1-methyl-2,3,4-triethylimidazolinium, 1,2,3,4-tetraethylimidazolinium, 1,3-dimethyl-2-ethylimidazolinium, 1-ethyl-2,3-dimethylimidazolinium, 1,2,3-triethylimidazolinium, 1,1-dimethyl-2-heptylimidazolinium, 1,1-dimethyl-2-(2-heptyl)imidazolinium, 1,1-dimethyl-2-(3-heptyl)imidazolinium, 1,1-dimethyl-2-(4-heptyl)imidazolinium, 1,1-dimethyl-2-dodecylimidazolinium, 1,1-dimethylimidazolinium, 1,1,2-trimethylimidazolinium, 1,1,2,4-tetramethylimidazolinium, 1,1,2,5-tetramethylimidazolinium, 1,1,2,4,5-pentamethylimidazolinium, tetramethylammonium, ethyltrimethylammonium, diethyldimethylammonium, triethylmethylammonium, tetraethylammonium, trimethylpropylammonium, diethylmethyl(2-methoxyethyl)ammonium, N,N-diethyl-N-methyl-N-(2-methoxyethyl)ammonium, N-ethyl-N,N-dimethyl-2-methoxyethylammonium, trimethylbenzylammonium, N,N-bis(2-methoxyethyl)pyrrolidinium, N,N-bis(2-hydroxyethyl)pyrrolidinium, N-methyl-N-2-methoxyethylpyrrolidinium, N,N-bis(2-ethylhexyl)morpholinium, N,N-bis(2-ethylhexyl)thiomorpholinium, N,N-bis(2-hydroxyethyl)piperidinium, N,N,N',N'-tetra(2-hydroxyethyl)piperazinium, N,N-bis(2-ethoxyethyl-1,1-dioxothiomorpholinium, N,N-bis(2-ethoxyethyl-1-oxothiomorpholinium, 1,3-dimethyl-1,4,5,6-tetrahydropyrimidinium, 1,2,3-trimethyl-1,4,5,6-tetrahydropyrimidinium, 1,2,3,4-tetramethyl-1,4,5,6-tetrahydropyrimidinium, 1,2,3,5-tetramethyl-1,4,5,6-tetrahydropyrimidinium, 1-methylquinuclidine, 1-ethylquinuclidine, 1-(2-hydroxyethyl)quinuclidine, 8-methyl-1,8-diazabicyclo[5.4.0]-7-undecenium, 5-methyl-1,5-diazabicyclo[4.3.0]-5-nonenium, 8-ethyl-1,8-diazabicyclo[5.4.0]-7-undecenium, 5-ethyl-1,5-diazabicyclo[4.3.0]-5-nonenium.

The anion in X⁻ may be any of an inorganic anion and an organic anion. Examples of the inorganic anion include halogen ions (F⁻, Cl⁻, Br⁻, I⁻), sulfonate anions (HSO₄⁻, SO₄²⁻), phosphate anions [P(=O)(OH)₂(O⁻), P(=O)(OH)(O⁻)₂, P(=O)(O⁻)₃], phosphonate anions [HP(=O)(OH)(O⁻), HP(=O)(O⁻)₂], PF₆⁻, BF₄⁻, AsF₆⁻, SbF₆⁻, ClO₄⁻, AlF₄⁻, AlCl₄⁻, TaF₆⁻, NbF₆⁻, SiF₆⁻, CN⁻, and F(HF)n⁻ (n represents an integer of 1 to 4).

Examples of the organic anion include an organic carboxylate anion, an organic sulfonate anion, an organic phosphate anion, an organic phosphonate anion, a dicyanamide ion [N⁻(CN)₂], an organic imide ion, an organic methide anion, an organic phosphorus anion, and an organoboron anion.

The organic carboxylate or sulfonate anion may be any of an aliphatic carboxylate or sulfonate anion, an aromatic carboxylate or sulfonate anion, and a heterocyclic carboxylate or sulfonate anion. In addition, the organic carboxylate or sulfonate anion may be an anion (polyvalent anion) of a polyvalent carboxylic acid or sulfonic acid, such as a dicarboxylic acid or a disulfonic acid. A preferred anion of the organic carboxylate anions is represented by the following formula (A1). In addition, a preferred anion of the organic sulfonate anions is represented by the following formula (A2).

Rb—CO₂⁻    Formula (A1)

Rc-SO₃⁻    Formula (A2)

In formulas (A1) and (A2), Rb represents a hydrogen atom, an alkyl group, a cycloalkyl group, an alkenyl group, an aryl group, or a heterocyclic group, and Rc represents an alkyl group, a cycloalkyl group, an alkenyl group, an aryl group, or a heterocyclic group.

The alkyl group, cycloalkyl group, alkenyl group, aryl group, and heterocyclic group in Rb and Rc are as defined for the alkyl group, cycloalkyl group, alkenyl group, aryl group, and heterocyclic group in Ra. In addition, these alkyl group, cycloalkyl group, alkenyl group, aryl group, and heterocyclic group optionally have a substituent, and examples of the substituent include the substituents given as examples in Ra.

Examples of the organic carboxylate anion include a formate anion, an acetate anion, a propionate anion, a butyrate anion, an isobutyrate anion, a valerate anion, an isovalerate anion, a pivalate anion, a laurate anion, a myristate anion, a palmitate anion, a stearate anion, a trifluoroacetate anion, a trichloroacetate anion, anions of amino acids (for example, anions of glycine, glutamine, glutamic acid, arginine, alginic acid, asparagine, aspartic acid, cysteine, proline, serine, tyrosine, valine, leucine, isoleucine, methionine, phenylalanine, tryptophan, histidine, threonine, and lysine), an acrylate anion, a methacrylate anion, a crotonate anion, an isocrotonate anion, an oleate anion, a cinnamate anion, a cyclopropanecarboxylate anion, a cyclopentanecarboxylate anion, a cyclohexanecarboxylate anion, a benzoate anion, a toluate anion, naphthalenecarboxylate anion, a nicotinate anion, an isonicotinate anion, a furoate anion, a thenoate anion, an oxalate mono- or dianion, a malonate mono- or dianion, a succinate mono- or dianion, a glutarate mono- or dianion, an adipate mono- or dianion, a pimelate mono- or dianion, a suberate mono- or dianion, an azelate mono- or dianion, a sebacate mono- or dianion, a maleate mono- or dianion, a fumarate mono- or dianion, a citraconate mono- or dianion, a mesaconate mono- or dianion, a phthalate mono- or dianion, a terephthalate mono- or dianion, an isophthalate mono- or dianion, a camphorate mono- or dianion, a 1,4-naphthalenedicarboxylate mono- or dianion, a trimellitate mono-, di-, or trianion, and a pyromellitate mono- to tetraanion, a mellitate mono- to hexanion.

Examples of the organic sulfonate anion include a methanesulfonate anion, an ethanesulfonate anion, a propanesulfonate anion, an octanesulfonate anion, a 2-ethylhexanesulfonate anion, a cyclohexanesulfonate anion, a benzenesulfonate anion, a toluenesulfonate anion, a naphthalenesulfonate anion, a 4,6-disulfo-1-naphthalenesulfonate mono-, di-, or trianion, and o-sulfobenzenecarboxylate mono- or dianion.

It is preferable that the organic phosphate or phosphonate anion be an anion represented by the following formula (A3).

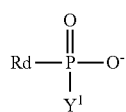

Formula (A3)

In formula (A3), Rd represents a hydrogen atom, an alkyl group, a cycloalkyl group, an alkenyl group, an aryl group, a heterocyclic group, an alkoxy group, or an aryloxy group, and $Y^1$ represents —$O^-$ or —ORe. Re herein represents a hydrogen atom, an alkyl group, a cycloalkyl group, an alkenyl group, an aryl group, or a heterocyclic group.

The alkyl group, cycloalkyl group, alkenyl group, aryl group, heterocyclic group, alkoxy group, and aryloxy group in Rd are as defined for the alkyl group, cycloalkyl group, alkenyl group, aryl group, heterocyclic group, alkoxy group, and aryloxy group in Ra, and the alkyl group, cycloalkyl group, alkenyl group, aryl group, and heterocyclic group in Re are as defined for the alkyl group, cycloalkyl group, alkenyl group, aryl group, and heterocyclic group in Ra.

Examples of the organic phosphate or phosphonate anion include a methylphosphonate mono- or dianion, an ethylphosphonate mono- or dianion, a propylphosphonate mono- or dianion, a heptylphosphonate mono- or dianion, a hexylphosphonate mono- or dianion, a decylphosphonate mono- or dianion, an octylphosphonate mono- or dianion, a vinylphosphonate mono- or dianion, an aminomethylphosphonate mono- or dianion, a phenylphosphonate mono- or dianion, a methylenediphosphonate mono- to tetraanion, a nitrilotris(methylenephosphonate mono- to hexaanion), a 1,4-phenylenediphosphonate mono- to tetraanion, a 4-phosphonobutyrate mono-, di-, or trianion, a p-xylenediphosphonate mono- to tetraanion, a monoethylphosphate mono- or dianion, a diethylphosphate anion, a dibutylphosphate anion, a didecylphosphate anion, a diphenylphosphate anion, and a phenylphosphate mono- or dianion.

It is preferable that the organic imide ion, the organic methide anion, the organic phosphorus anion, and the organoboron anion be anions represented by the following formulas (A4) to (A7), respectively.

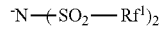

Formula (A4)

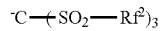

Formula (A5)

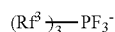

Formula (A6)

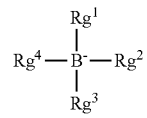

Formula (A7)

In formulas (A4) to (A7), $Rf^1$ to $Rf^3$ represent an alkyl group substituted with a fluorine atom or an aryl group substituted with a fluorine atom, two $Rf^1$s are optionally the same with or different from each other, three $Rf^2$s are optionally the same with or different from each other, and three $Rf^3$s are optionally the same with or different from each other. $Rg^1$ to $Rg^4$ each independently represent an alkyl group, a cycloalkyl group, or an aryl group.

It is preferable that the carbon numbers of the alkyl group substituted with a fluorine atom in $Rf^1$ to $Rf^3$ be 1 to 20, more preferably 1 to 12, still more preferably 1 to 8, and particularly preferably 1 or 2. The alkyl group substituted with a fluorine atom is an alkyl group substituted with at least one fluorine atom, and it is preferable that the alkyl group substituted with a fluorine atom be a perfluoroalkyl group. Examples of the alkyl group substituted with a fluorine atom include perfluoromethyl, perfluoroethyl, perfluoropropyl, perfluorobutyl, perfluoropentyl, perfluorohexyl, perfluorooctyl, perfluoro-2-ethylhexyl, difluoromethyl, 2,2,2-trifluoroethyl, 1,1-difluoroethyl, 1,1,2-trifluoroethyl, 1,1,2,2-tetrafluoroethyl, and perfluorobenzyl.

It is preferable that the carbon numbers of the aryl group substituted with a fluorine atom in $Rf^1$ to $Rf^3$ be 6 to 20, more preferably 6 to 12, still more preferably 6 to 10, and particularly preferably 6 to 8. The aryl group substituted with a fluorine atom is an aryl group substituted with at least one fluorine atom, and it is preferable that the aryl group substituted with a fluorine atom be a perfluoroaryl group. Examples of the aryl group substituted with a fluorine atom include perfluorophenyl, perfluorotolyl, and 2,6-dichloro-3,4,5-trifluorophenyl.

The alkyl group, cycloalkyl group, and aryl group in $Rg^1$ to $Rg^4$ are as defined for the alkyl group, cycloalkyl group, and aryl group in Ra. It is preferable that $Rg^1$ to $Rg^4$ each be an alkyl group or an aryl group, preferably a C1 to C8 alkyl group, or a C6 to C16 aryl group. It is preferable that the aryl group be a phenyl group or a naphthyl group.

Examples of the above-described organoboron anion herein include the following anions.

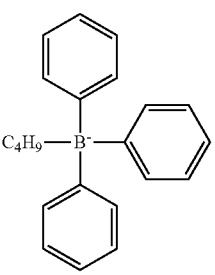

-continued

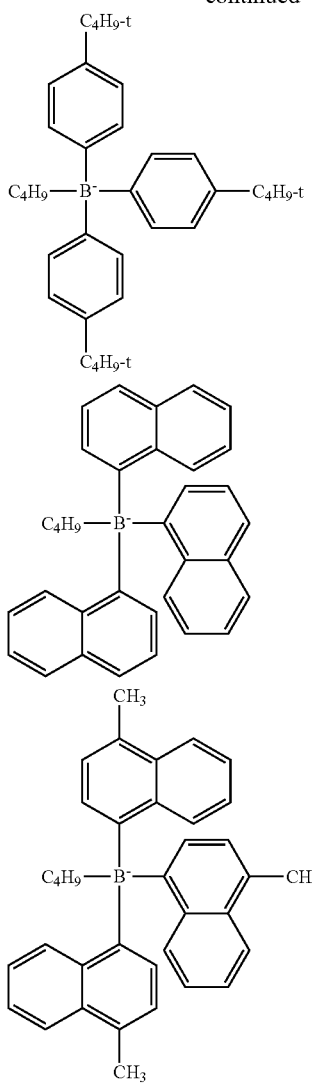

It is preferable that X⁻ be a halogen ion, a carboxylate anion, a sulfonate anion, a phosphate anion, a phosphonate anion, a dicyanamide ion, or an anion represented by formula (A4), more preferably a halogen ion, a carboxylate anion, a sulfonate anion, a phosphate anion, a phosphonate anion, a dicyanamide ion, or a bis(trifluromethanesulfonyl) imide ion, particularly preferably a halogen ion or a carboxylate anion, and most preferably a carboxylate anion.

Examples of the ionic compound include a quaternary phosphonium salt in addition to the compound represented by the formula (1) or (2), and the quaternary phosphonium salt is preferable also in the present disclosure. Examples of the quaternary phosphonium of the quaternary phosphonium salt include tetramethylphosphonium, tetraethylphosphonium, tetrabutylphosphonium, triethylmethylphosphonium, methyltributylphosphonium, and dimethyldiethylphosphium. It is preferable that the anion be the X⁻.

It is preferable that the compound represented by the formula (1) or (2) be represented by any one of the following formulas (1a), (1b) and (2a) to (2c).

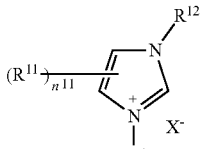
Formula (1a)

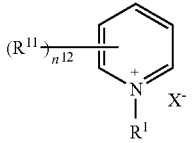
Formula (1b)

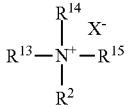
Formula (2a)

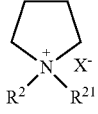
Formula (2b)

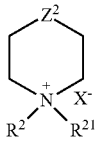
Formula (2c)

$R^1$, $R^2$, and $X^-$ in formulas (1a), (1b), and (2a) to (2c) are as defined for $R^1$, $R^2$, and $X^-$ in the formula (1) or (2), and preferred ranges thereof are also the same. $R^{11}$ and $R^{12}$ each independently represent a substituent. $n^{11}$ represents an integer of 0 to 3, and $n^{12}$ represents an integer of 0 to 5. When two or more $R^{11}$ exist herein, a plurality of $R^{11}$ are optionally the same with or different from each other. In addition, at least two $R^{11}$ are optionally bonded to each other to form a ring. $R^{13}$ to $R^{15}$ each independently represent an alkyl group, an alkenyl group, a cycloalkyl group, an aryl group, or a heterocyclic group. However, there is not a case where at least two of $R^2$ and $R^{13}$ to $R^{15}$ are bonded to each other to form a ring. $R^{21}$ is as defined for $R^2$, and preferred ranges thereof are also the same. $Z^2$ represents a single bond, a methylene group, —C(=O)—, —O—, —S—, —S(=O)—, —SO$_2$—, —N(Rα1)-, or —N⁺(Rα1)(Rα2)-, wherein Rα1 represents a hydrogen atom or a substituent, and Rα2 represents a substituent. Rα1 and Rα2 herein are optionally bonded to each other to form a ring.

The substituent in $R^{11}$ and of $R^{12}$ are as defined for Ra. $R^1$ is as defined for $R^1$ in formula (1) and preferred ranges thereof are also the same. $R^2$ is as defined for $R^2$ in formula (2) and preferred ranges thereof are also the same. $R^{13}$ to $R^{15}$ are as defined for $R^3$ to $R^5$ in formula (2) and preferred ranges thereof are also the same, except that there is not a case where two or more of $R^{13}$ to $R^{15}$ are bonded to each other to form a ring in formula (2).

Examples of the substituent in Rα1 include the substituents given as examples in Ra, and it is preferable that the substituent in Rα1 be an alkyl group, an alkenyl group, a cycloalkyl group, an aryl group, a heterocyclic group, an acyl group, or a sulfonyl group, more preferably an alkyl group, an alkenyl group, a cycloalkyl group, an aryl group, or a heterocyclic group, and still more preferably an alkyl group, an alkenyl group, a cycloalkyl group, or an aryl group. The substituent in Rα2 is as defined for the substituent in Rα1, and preferred ranges thereof are also the same.

It is preferable that the ring formed in such a way that at least two $R^{11}$ are bonded to each other be a 5- or 6-membered ring, more preferably a benzene ring or a hetero ring, still more preferably a benzene ring or a hetero aromatic ring, and particularly preferably a benzene ring.

It is preferable that the ring formed in such a way that Rα1 and Rα2 are bonded to each other be a 5- or 6-membered ring, more preferably a nitrogen-containing saturated ring, and still more preferably a pyrrolidine ring, a piperidine ring, a piperazine ring, a morpholine ring, or a thiomorpholine ring.

It is preferable that $R^{11}$ and $R^{12}$ each be an alkyl group, and it is preferable that $R^{13}$ to $R^{15}$, $R^2$, and $R^{21}$ each be an alkyl group, or an aryl group, more preferably an alkyl group. In addition, it is preferable that $R^1$ and $R^{12}$ be alkyl groups each having different carbon numbers.

In the present disclosure, among the compounds represented by formulas (1a), (1b), and (2a) to (2c), the compound represented by the formula (1a), (1b), or (2a) is preferable, the compound represented by formula (1a) or (2a) is more preferably used, and the compound represented by formula (1a) is still more preferably used.

Examples of the ionic compound to be used in the present disclosure include the following ionic liquids. Examples thereof include 1-butyl-3-methylimidazolium acetate, 1-butyl-3-methylimidazolium chloride, 1-butyl-3-methylimidazolium bromide, 1-butyl-3-methylimidazolium dicyanamide, 1-ethyl-3-methylimidazolium bis(trifluoromethylsulfonyl)imide, 1-butyl-3-methylimidazolium bis(trifluoromethylsulfonyl)imide, 1-hexyl-3-methylimidazolium bis(trifluoromethylsulfonyl)imide, 1-octyl-3-methylimidazolium bis(trifluoromethylsulfonyl)imide, 1-propyl-2,3-dimethylimidazolium bis(trifluoromethylsulfonyl)imide, 1-butyl-2,3-dimethylimidazolium bis(trifluoromethylsulfonyl)imide, N,N-diethyl-N-methyl-N-(2-methoxyethyl)ammonium bis(trifluoromethylsulfonyl)imide, 1-ethyl-3-methylimidazolium tris(trifluoromethylsulfonyl)methide, 1-butyl-3-methylimidazolium tris(trifluoromethylsulfonyl)methide, 1-hexyl-3-methylimidazolium tris(trifluoromethylsulfonyl)methide, 1-octyl-3-methylimidazolium tris(trifluoromethylsulfonyl)methide, 1-propyl-2,3-dimethylimidazolium tris(trifluoromethylsulfonyl)methide, 1-butyl-2,3-dimethylimidazolium tris(trifluoromethylsulfonyl)methide, N,N-diethyl-N-methyl-N-(2-methoxyethyl)ammonium tris(trifluoromethylsulfonyl)methide, 1-ethyl-3-methylimidazolium tris(pentafluoroethyl)trifluorophosphate, 1-butyl-3-methylimidazolium tris(pentafluoroethyl)trifluorophosphate, 1-hexyl-3-methylimidazolium tris(pentafluoroethyl)trifluorophosphate, 1-octyl-3-methylimidazolium tris(pentafluoroethyl)trifluorophosphate, 1-propyl-2,3-dimethylimidazolium tris(pentafluoroethyl)trifluorophosphate, 1-butyl-2,3-dimethylimidazolium tris(pentafluoroethyl)trifluorophosphate, N,N-diethyl-N-methyl-N-(2-methoxyethyl)ammonium tris(pentafluoroethyl)trifluorophosphate, 1-ethyl-3-methylimidazolium hexafluorophosphate, 1-butyl-3-methylimidazolium hexafluorophosphate, 1-hexyl-3-methylimidazolium hexafluorophosphate, 1-octyl-3-methylimidazolium hexafluorophosphate, 1-propyl-2,3-dimethylimidazolium hexafluorophosphate, 1-butyl-2,3-dimethylimidazolium hexafluorophosphate, N,N-diethyl-N-methyl-N-(2-methoxyethyl)ammonium hexafluorophosphate, 1-ethyl-3-methylimidazolium butyltriphenylborate, 1-butyl-3-methylimidazolium butyltris(4-t-butylphenyl)borate, 1-hexyl-3-methylimidazolium butyltris(1-naphthyl)borate, 1-octyl-3-methylimidazolium butyltris(4-methylnaphthalen-1-yl)borate, 1-propyl-2,3-dimethylimidazolium butyltriphenylborate, 1-butyl-2,3-dimethylimidazolium hexyltris(4-t-butylphenyl)borate, N,N-diethyl-N-methyl-N-(2-methoxyethyl)ammonium 2-ethylhexyltriphenylborate, 1-butylpyridinium hexafluorophosphate, 1-hexylpyridinium hexafluorophosphate, 1-ethyl-3-methylimidazolium tris(pentafluoroethyl)trifluorophosphate, 1-cyanomethyl-3-methylimidazolium bis(trifluoromethylsulfonyl)imide, N-hexyl-4-dimethylaminopyridinium bis(trifluoromethylsulfonyl)imide, 1-(2-hydroxyethyl)-3-methylimidazolium bis(trifluoromethylsulfonyl)imide, N-(3-hydroxypropyl)pyridinium bis(trifluoromethylsulfonyl)imide, N-ethyl-N,N-dimethyl-2-methoxyethylammonium tris(pentafluoroethyl)trifluorophosphate, 1-(2-hydroxyethyl)-3-methylimidazolium tris(pentafluoroethyl)trifluorophosphate, N-(3-hydroxypropyl)pyridinium tris(pentafluoroethyl)trifluorophosphate, N-(methoxyethyl)-N-methylmorpholium tris(pentafluoroethyl)trifluorophosphate, 1-(2-methoxyethyl)-1-methyl-pyrrolidinium tris(pentafluoroethyl)trifluorophosphate, 1-(methoxyethyl)-1-methylpiperidinium tris(pentafluoroethyl)trifluorophosphate, 1-(methoxyethyl)-1-methyl-piperidinium bis(trifluoromethylsulfonyl)imide, N-(methoxyethyl)-1-methylpyrrolidinium bis(trifluoromethylsulfonyl)imide, and N-(methoxyethyl)-N-methylmorpholium bis(trifluoromethylsulfonyl)imide.

It is to be noted that as the ionic compound including the ionic liquid, those commercially available can also be used. Examples of such compounds include the following ionic liquids.

1) Non-Water-Miscible Ionic Liquids

1-Ethyl-3-methylimidazolium bis(trifluoromethylsulfonyl)imide, 1-propyl-2,3-dimethylimidazolium bis(trifluoromethylsulfonyl)imide, 1-butyl-3-methylimidazolium bis(trifluoromethylsulfonyl)imide, and 1-propyl-2,3-dimethylimidazolium tris(trifluoromethylsulfonyl)methide [all commercially available from Covalent Associates Inc.], N,N-diethyl-N-methyl-N-(2-methoxyethyl)ammonium bis(trifluoromethylsulfonyl)imide, 1-hexyl-3-methylimidazolium bis(trifluoromethylsulfonyl)imide, 1-octyl-3-methylimidazolium bis(trifluoromethylsulfonyl)imide, 1-ethyl-2,3-dimethylimidazolium bis(trifluoromethylsulfonyl)imide, and 1-butyl-2,3-dimethylimidazolium bis(trifluoromethylsulfonyl)imide [all commercially available from KANTO CHEMICAL CO., INC.].

2) Water-Miscible Ionic Liquids

N,N-Diethyl-N-methyl-N-(2-methoxyethyl)ammonium tetrafluoroborate, and 1-ethyl-3-methylimidazolium acetate [all commercially available from KANTO CHEMICAL CO., INC.], 1-methyl-3-propylimidazolium iodide [commercially available from Tokyo Chemical Industry Co., Ltd.], and 1-ethyl-3-methylimidazolium trifluoroacetate [commercially available from Merck KGaA].

The ionic compound may be used singly, or two or more thereof may be used together. In the present disclosure, it is preferable that the content of the ionic compound be 0.001 times or more and less than 1.000 times, more preferably 0.01 times or more and less than 1.000 times, still more preferably 0.01 times or more and less than 1.000 times, particularly preferably 0.01 to 0.8 times, and most preferably 0.05 to 0.7 times the mass of the cellulose in terms of mass ratio.

The ionic compound is a salt of an anionic component and a cationic component, and there exist ionic substances, when being in a liquid state, which exhibits a solution characteristic of dissolving the cellulose completely because of a high affinity with a cellulose molecule. With respect to the interaction between the ionic compound and the cellulose molecule, it is proposed that dissolution into the ionic compound occurs by a mechanism such that the ionic compound acts on a hydroxyl group (hydroxy group), which the cellulose molecule has, to cut a hydrogen bond formed by hydroxyl groups of cellulose molecules, and thereby penetrates between the cellulose molecules, as reported in, for example, Green Chem., 2015, 17, 694-714.

Therefore, when the content of the ionic compound is 1.000 times the mass of the cellulose, crystals in the cellulose dissolve, resulting in bringing about deterioration in modulus of elasticity. Conversely, when the content of the ionic compound is less than 0.001 times the mass of the cellulose, most of the strong hydrogen bonds between cellulose molecules remains left, and therefore the deterioration in modulus of elasticity does not occur, but micronization of the cellulose cannot be brought about by only the shear stress in a processing machine. As described herein, it is important to achieve both of the micronization of the cellulose in a processing machine and, in micronized cellulose, an improvement in mechanical characteristics obtained when a strong hydrogen bond between cellulose molecules is formed.

<Additional Additive>

The thermoplastic resin composition of the present disclosure can contain, in addition to those described above, an additional additive component, such as an antioxidizing agent, a light stabilizer, a radical scavenger, an ultraviolet ray absorber, a colorant (dye, organic pigment, inorganic pigment), a filler, a lubricant, a plasticizer, a processing aid such as an acrylic processing aid, a foaming agent, a lubricating agent such as paraffin wax, a surface treatment agent, a crystal nucleating agent, a mold-releasing agent, a hydrolysis-preventing agent, an antiblocking agent, an antistatic agent, an antifogging agent, an antifungal agent, an ion-trapping agent, a flame retardant, and a flame retardant auxiliary, within a range where the above-described object is not impaired.

Examples of the antioxidizing agent or a deterioration-preventing agent include a phenol-based antioxidizing agent, a phosphorus-based antioxidizing agent, a sulfur-based antioxidizing agent, a hydroxylamine-based antioxidizing agent, and an amine-based antioxidizing agent, and as the phenol-based antioxidizing agent, a hindered phenol-based compound having a t-alkyl group at an ortho position is preferable.

Examples of the phenol-based antioxidizing agent include tetrakis[methylene-3(3',5'-di-t-butyl-4-hydroxyphenyl)propionate]methane, octadecyl-3-(3,5-di-t-butyl-4-hydroxyphenyl)propionate, 3,9-bis[2-{3-(3-t-butyl-4-hydroxy-5-methylphenyl)propionyloxy}-1,1-dimethylethyl]-2,4,8,10-tetraoxaspiro[5.5]undecane, triethylene glycol-N-bis-3-(3-t-butyl-5-methyl-4-hydroxyphenyl)propionate, 1,6-hexanediolbis[3-(3,5-di-t-butyl-4-hydroxyphenyl)propionate], and 2,2-thiobis-diethylenebis[3-(3,5-di-t-butyl-4-hydroxyphenyl)propionate], more preferably, 3,9-bis[2-{3-(3-t-butyl-4-hydroxy-5-methylphenyl)propionyloxy}-1,1-dimethylethyl]-2,4,8,10-tetraoxaspiro[5.5]undecane, lauryl-3,5-t-butyl-4-hydroxybenzoate, palmityl-3,5-t-butyl-4-hydroxybenzoate, stearyl-3,5-t-butyl-4-hydroxybenzoate, behenyl-3,5-t-butyl-4-hydroxybenzoate, 2,4-di-t-butyl-phenyl-3,5-di-t-butyl-4-hydroxybenzoate, and tocopherols.

Examples of the phosphorus-based antioxidizing agent include tris(nonylphenyl) phosphite, tris(2,4-di-t-butylphenyl) phosphite, distearyl pentaerythritol diphosphite, bis(2,4-di-t-butylphenyl) pentaerythritol diphosphite, bis(2,4-di-t-butyl-6-methylphenyl) pentaerythritol diphosphite, bis(2,6-di-t-butyl-4-methylphenyl) pentaerythritol diphosphite, bis (2,4-dicumylphenyl) pentaerythritol diphosphite, tetrakis(2, 4-di-t-butylphenyl)-4,4'-diphenylene diphosphonite, 2,2'-methylenebis(4,6-di-t-butylpheny) 2-ethylhexyl phosphite, 2,2'-ethylidenebis(4,6-di-t-butylphenyl) fluorophosphite, bis (2,4-di-t-butyl-6-methylphenyl) ethyl phosphite, 2-(2,4,6-tri-t-butylphenyl)-5-ethyl-5-butyl-1,3,2-oxaphosphorinane, 2,2',2'-nitrilo[triethyl-tris(3,3',5,5'-tetra-t-butyl-1,1'-biphenyl-2,2'-diyl) phosphite, and 2,4,8,10-tetra-t-butyl-6-[3-(3-methyl-4-hydroxy-5-t-butylphenyl)propoxy]dibenzo[d,f][1, 3,2]dioxaphosphepin.

Examples of the sulfur-based antioxidizing agent include dilauryl 3,3'-thiodipropionate, tridecyl 3,3'-thiodipropionate, dimyristyl 3,3'-thiodipropionate, distearyl 3,3'-thiodipropionate, lauryl stearyl 3,3'-thiodipropionate, neopentanetetrayl tetrakis(3-laurylthiopropionate), and bis[2-methyl-4-(3-n-alkyl (alkyl having 12 to 14 carbon atoms) thiopropionyloxy)-5-t-butylphenyl]sulfide.

Examples of the light stabilizer include a hindered amine light stabilizer (light stabilizer having a 2,2,6,6-tetramethylpiperidine skeleton in a molecule) having a molecular weight of 1000 or more.

Examples of the ultraviolet ray absorber include a benzotriazole-based compound, a triazine-based compound, a benzophenone-based compound, a salicylate-based compound, a cyanoacrylate-based compound, and a nickel-based compound.

Examples of the colorant include carbon black, an inorganic pigment, and an organic pigment. Examples of the carbon black include furnace black, channel black, acetylene black, and lamp black. Examples of the inorganic pigment include iron black, red iron oxide, titanium oxide, cadmium red, cadmium yellow, ultramarine blue, cobalt blue, titanium yellow, red lead, yellow lead, and Prussian blue. Examples of the organic pigment include quinacridone, polyazo yellow, anthraquinone yellow, polyazo red, azo lake yellow, perylene, phthalocyanine green, phthalocyanine blue, and isoindolinone yellow. These colorants may be used singly, or two or more thereof may be used together.

Preferred examples of the filler include a metal compound such as silica, hydroxyapatite, alumina, titanic, boehmite, talc, or calcium carbonate.

<<Method for Producing Thermoplastic Resin Composition>>

Micronization of cellulose is first performed in a thermoplastic resin containing the cellulose.

When the thermoplastic resin composition is produced, the content of the cellulose may be made 1 to 100 parts by mass based on 100 parts by mass of the thermoplastic resin, and in the case where the cellulose and the ionic compound are compounded, the content of the ionic compound may be made 0.001 times or more and less than 1.000 times the mass of the cellulose by compounding each of the thermoplastic resin and the cellulose, or each of the thermoplastic resin, the cellulose and the ionic compound. In particular, it is preferable to prepare a mixture of the cellulose and the ionic compound, namely a cellulose composition, and to compound this cellulose composition and the thermoplastic resin for the purpose of performing the micronization of the cellulose. Therefore, in the case where the cellulose and the ionic compound are compounded, a step of preparing the cellulose composition having a content of the ionic compound of 0.1% by mass or more and less than 50% by mass is performed. In the present disclosure, it is preferable that the amount of the cellulose composition to be compounded be made such that the content of the cellulose is 1 to 100 parts by mass based on 100 parts by mass of the thermoplastic resin.

The ionic compound herein, such as, for example, a halogen anion (chlorine anion in particular), absorbs moisture into a liquid state in some cases depending on the storage state. In such a case, it is preferable to use the ionic compound that has been made into a solid state at normal temperature by evaporating water through vacuum drying.

Cellulose has a strong intermolecular bonding force due to hydrogen bonds by hydroxyl groups in the molecule. It is considered that when the resin having in a polymer molecular chain a group containing a partial structure of an acid anhydride is contained as one of the thermoplastic resins, the plant fiber is micronized, and further, when the ionic substance is allowed to coexist therein, micronization is more facilitated and the ionic compound further cuts the hydrogen bonds between cellulose molecules. Moreover, it is considered that the anionic component among the components of the ionic compound directly acts on a hydrogen atom of the hydroxyl group which the cellulose molecule has, and therefore it is inferred that the structure of the anionic component greatly affects on the ability of dissolving the cellulose. Cellulose itself has a strong intermolecular bonding force, as described above, and therefore the micronization cannot be allowed to progress by only the shear stress in a processing machine. However, when the resin having in a polymer molecule a group containing a partial structure of an acid anhydride exists, the tight adhesion at the interface between the cellulose and a resin is improved, and the shear stress, which is generated in the processing machine, in the resin, is transferred sufficiently to the cellulose, and therefore the micronization is made easy to be brought about. Further, when the ionic compound is used together therein, the intermolecular bonding force of the cellulose is partially weakened, thereby enabling the micronization to progress further.

After thermoplastic resin and the cellulose composition are compounded, a step of performing processing-by-kneading is performed, and in this step, the cellulose is micronized. In particular, it is preferable to perform the step of performing processing-by-kneading after the resin having in a polymer molecule a group containing a partial structure of an acid anhydride and the cellulose composition are compounded, and it is preferable to blend a resultant product with the base resin (thermoplastic resin other than the resin having in a polymer molecule a group containing a partial structure of an acid anhydride) after this step of performing processing-by-kneading. In this processing-by-kneading step, it is preferable to perform kneading in a processing machine at a stage of performing processing and molding by extrusion, injection, or the like.

The kneading temperature is not particularly limited as long as the resin can be kneaded, and it is desirable that when the ionic compound is not contained, the melting point of the resin (the softening point of the resin in the case of an amorphous resin) be set to the lower limit, or when the ionic compound is contained, the melting point of the resin be set to the lower limit besides the above-described condition, and the temperature at which thermal decomposition of the cellulose occurs little be set to the upper limit. Accordingly, the lower limit temperature changes according to the type of the ionic compound, but it is preferable that the upper limit temperature be 300° C. or less, more preferably 250° C. or less, and still more preferably 230° C. or less. With respect to stirring in the kneading, it is preferable to assemble a screw configuration that can secure sufficient kneadability by disposing a kneading disk appropriately in a screw shaft direction, or by other methods, and to perform kneading at a number of rotations of a screw (usually, in a range of about 100 to about 300 rpm) capable of obtaining necessary production quantity. As the apparatus for performing processing-by-kneading, an apparatus of a same direction twin-screw system is preferable, and examples thereof include a twin-screw extruder [KZW15TW-45MGNH manufactured by TECHNOVEL CORPORATION]. However, the apparatus for performing processing-by-kneading is not limited to the same direction twin-screw extruder and may be of any system, such as a single-screw extruder, a different direction twin-screw extruder, multi-screw extruder of triple-screw or more, a batch type kneader (such as a kneader and a Banbury), as long as a sufficient kneadability is obtained and the effects which are the same as the effects of the present disclosure are obtained.

<<Molded Article and Method for Producing Molded Article>>

A molded article of the present disclosure is provided with a resin part formed with a thermoplastic resin composition, the thermoplastic resin composition containing: thermoplastic resins; and cellulose, wherein at least one of the thermoplastic resins is a resin having in a polymer molecule at least one group selected from a group containing a partial structure of an acid anhydride and a group containing an acylated cellulose structure. That is, at least a part or the whole of the molded article is formed with the thermoplastic resin composition. The molded article of the present disclosure is, for example, a lamp body of a lighting appliance, a speaker unit, a connection box, a connector, a pulley, or a film for a house. When the molded article is a film for a house, the film for a house includes a layer formed with the thermoplastic resin composition.

The thermoplastic resin composition to be used for forming the resin part which the molded article of the present disclosure is provided with contains in the thermoplastic resin composition: cellulose; and a resin having in a polymer molecule a group containing a partial structure of an acid anhydride, and therefore a hydroxyl group of the cellulose and the group containing a partial structure of an acid anhydride in the polymer molecule react in some cases. Therefore, when the reaction occurs, the acid anhydride part of the resin having in a polymer molecule a group containing a partial structure of an acid anhydride acts as an acylation agent, and the cellulose is converted into cellulose which is acylated with this acylating agent to form a composite with the resin having in a polymer molecule a partial structure of an acid anhydride. Conversely, when the reaction does not occur, the resin having in a polymer molecule a group containing a partial structure of an acid anhydride remains as it is.

Therefore, the resin part which the molded article of the present disclosure is provided with contains a resin having in a polymer molecule at least one group selected from a group containing a partial structure of an acid anhydride (namely, a group not having reacted with cellulose) and a group containing an acylated cellulose structure (in the case where reaction has occurred in at least a part) in addition to an ionic compound.

The molded article of the present disclosure is provided with a resin part molded using a thermoplastic resin composition, especially a thermoplastic resin composition produced by the method for producing a thermoplastic resin composition. The resin part, which is the whole or a part of the molded article of the present disclosure, can be molded using the thermoplastic resin composition, especially the thermoplastic resin composition produced by the method for producing a thermoplastic resin composition, by, for example, injection molding.

<Lamp Body of Lighting Appliance>

FIG. 1 is a schematic sectional diagram showing an example of a lamp body of a lighting appliance according to an embodiment of the molded article. In FIG. 1, a configuration of a headlight (headlamp) as a lighting appliance for a vehicle is shown as an example of a lighting appliance 100. The lighting appliance 100 includes a lamp body 101, a front cover 102, a light source 103, a reflection mirror (reflector) 104, and a socket part 105. The lamp body 101 includes an opening 111 at the front. The front cover 102 is attached to the lamp body 101 in such a way as to cover the opening 111 of the lamp body 101. Thereby, a space 110 closed up tightly by the lamp body 101 and the front cover 102 is formed.

The light source 103 and the reflection mirror 104 are disposed in the space 110. The light source 103 is, for example, a LED light bulb or a halogen light bulb. The light source 103 is connected to the socket part 105 fixed in a through hole 112 formed in the lamp body 101 and emits light by electric power supplied from the socket part 105.

The reflection mirror 104 includes a concave surface 140 dented toward the front cover 102. A hole is formed at the central part of the reflection mirror 104, and the light source 103 is inserted and fixed in the hole. The reflection mirror 104 reflects the light emitted from the light source 103 by the concave surface 140 to lead the light on the side of the front cover 102.

The front cover 102 is formed from a light (visible light)-transmittable resin material. The front cover 102 also functions as a lens that condenses or diffuses light from the light source 103.

The lamp body 101 herein is provided with a resin part formed with the above-described thermoplastic resin composition. Thereby, weight reduction and high strengthening of the lamp body 101 can be achieved.

The method of producing the lamp body 101 is not particularly limited, and the lamp body 101 can be molded by injection molding of injecting the thermoplastic resin composition into a metal mold. Thereby, the resistance against wear of a metal mold is improved, and a metal mold is made difficult to corrode.

FIG. 1 shows an example of a case where the whole of the lamp body 101 is formed by the resin part, but the lamp body 101 is not limited to this and may include the resin part and a part formed with a material other than a resin. In addition, FIG. 1 shows an example of a case where the lighting appliance 100 is a headlight; however, the lighting appliance 100 is not limited to this, and the lamp body 101 can be applied as a lamp body of a lighting appliance for a vehicle, such as a brake lamp, a fog lamp, and a reversing light. Further, the lamp body 101 can be applied as a body part (housing) of various lighting appliances, not limited to the lighting appliance for a vehicle.

<Speaker Unit>

Figure 2:
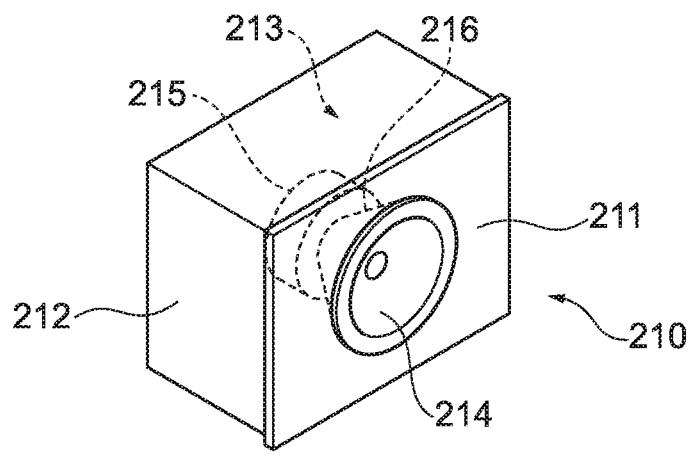
FIG. 2 is a perspective diagram showing an example of a speaker unit according to an embodiment of a molded article of the present disclosure.

FIG. 2 is a perspective diagram showing an example of a speaker unit according to an embodiment of the molded article. A speaker unit 210 is provided with: an almost tightly-closed case body (enclosure) 213 formed by a board-like baffle 211 and a box-like storing part 212 bonded to the back of the baffle 211; and a speaker 214 held by the case body 213 in such a way as to expose a sound-emitting surface to the surface of the baffle 211. It is to be noted that the case body (enclosure) 213 is also generally called a speaker box or a cabinet and has various shapes, such as a box type, a cylindrical type, and a conical type, depending on an apparatus or the like to which the case body 213 is applied. The speaker 214 includes: an exciter 215 as a source of vibration for a magnetic circuit; and cone paper 216 that releases a sound wave generated by the vibration of the exciter 215 outside the case body 213.

Figure 3:
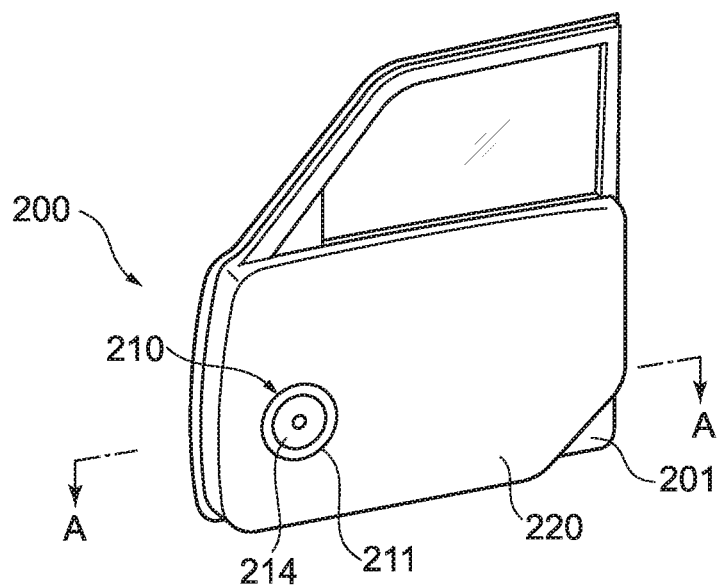
FIG. 3 is a perspective diagram showing an aspect of applying a speaker unit according to an embodiment of a molded article of the present disclosure to a speaker apparatus for automotive application.
Figure 4:
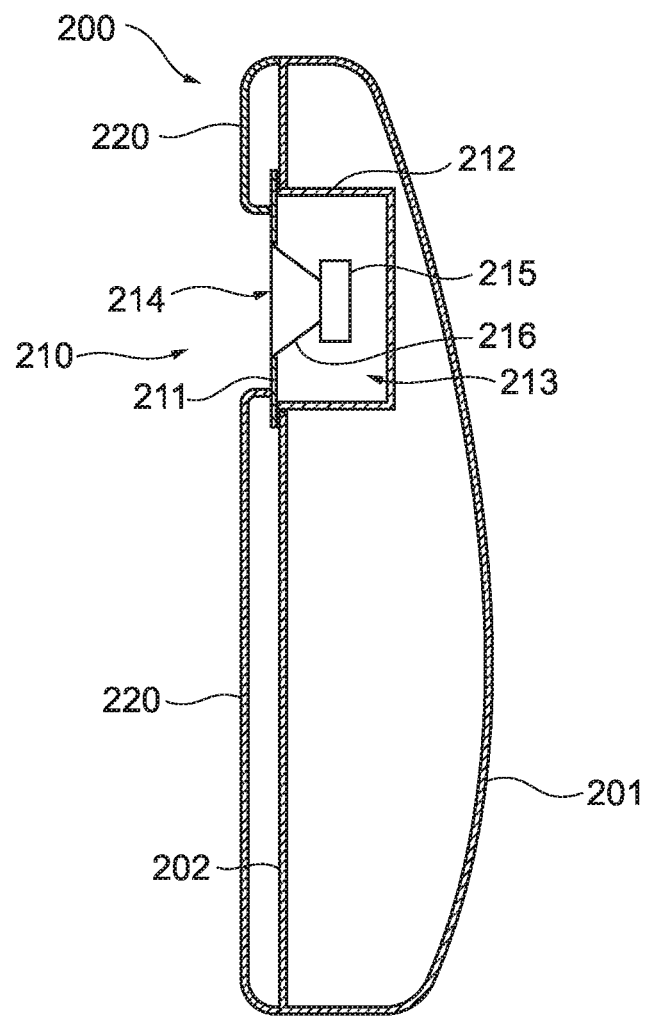
FIG. 4 is a sectional diagram of the speaker apparatus for automotive application shown in FIG. 3, the sectional diagram viewed from the arrow direction along the line A-A in FIG. 3.

FIG. 3 is a perspective diagram showing a speaker apparatus 200 for automotive application, which is an embodiment of applying the speaker unit to a speaker apparatus for automotive application. FIG. 4 is a sectional diagram of the speaker apparatus 200 for automotive application shown in FIG. 3, the sectional diagram viewed from the arrow direction along the line A-A in FIG. 3. As shown in FIGS. 3 and 4, the speaker unit 210 to be used as the speaker apparatus 200 for automotive application is provided between an outer panel 201 on the vehicle outer side and an inner panel 202 on the vehicle inner side, the panels forming a door in a vehicle, such as an automobile, and is attached in a state where the speaker unit 210 is exposed from the opening of the inner panel 202. It is to be noted that to the inner panel 202, an inner trim 220 covering the surface of the inner panel 202 is attached in a state of exposing the speaker unit 210.

In the speaker unit 210 used for the speaker apparatus 200 for automotive application shown in FIGS. 2 to 4, the above-described thermoplastic resin composition is used for the baffle 211, the storing part 212, and the cone paper 216 of the case body 213. Thereby, weight reduction and improvements in strength characteristics and acoustic characteristics can be achieved in the speaker apparatus 200 for automotive application. The speaker unit 210 in particular can contribute to reducing fuel consumption of a vehicle due to the weight reduction and is made highly strong, and therefore vibration of the case body 213 caused by vibration of a vehicle can be suppressed. As a result, noise attributable to the vibration of the case body 213 can be reduced and the acoustic characteristics can be improved. In addition, the above-described thermoplastic resin composition is used for the speaker unit 210, and therefore the speaker unit 210 exhibits an excellent whitening resistance. Further, the speaker unit 210 includes a highly strong case body 213 formed with the thermoplastic resin composition and therefore is rich in recyclability.

The thermoplastic resin composition in particular has a small linear thermal expansion coefficient at room temperature and is excellent in fluidity at high temperatures, and therefore the thermoplastic resin composition can be used as a stable composite material. Therefore, a speaker unit 210 having small variations in acoustic characteristics can easily be produced. In addition, the speaker unit 210 formed using the thermoplastic resin composition has a smooth surface and a pleasant feel and is excellent in colorability to a resin. Therefore, simplification of coating can be realized, and a speaker unit 210 excellent in appearance and colorability can be provided. Further, the cellulose obtained by micronizing a plant-derived fiber into a micro order, preferably a nano order, is used as a reinforcing material for the thermoplastic resins, and therefore reduction of environmental load is enabled, and resources can effectively be utilized.

The object of applying the speaker unit is not limited to an automobile, and examples thereof include mobile objects such as a two-wheeled vehicle, a railroad vehicle, a plane, and a ship, a computer apparatus, a headphone, or all the speaker apparatuses to be installed for home-use.

<Connection Box and Connector>

Figure 5:
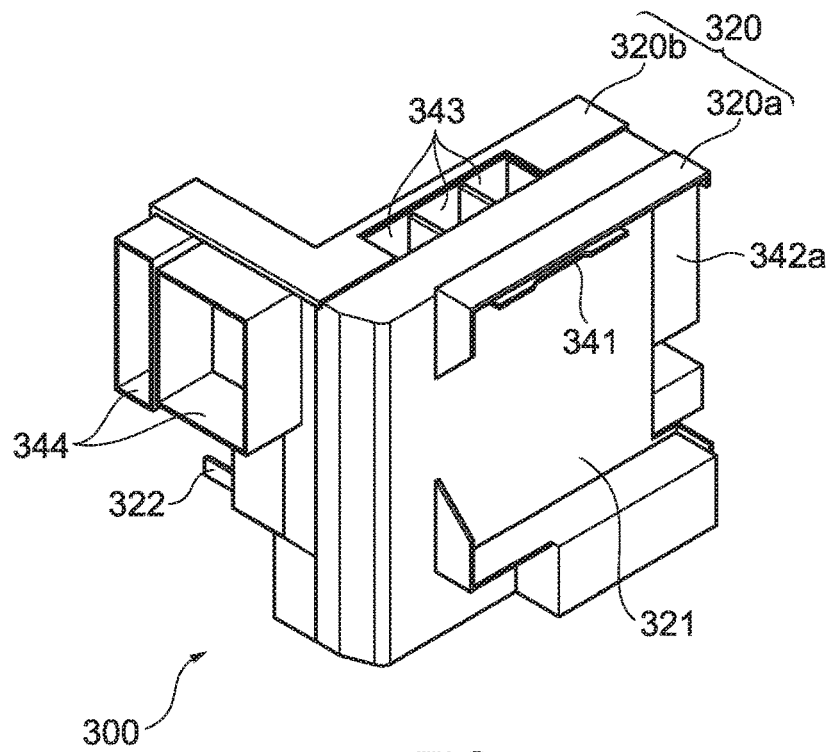
FIG. 5 is a perspective diagram showing an example of a connection box according to an embodiment of a molded article of the present disclosure.
Figure 6:
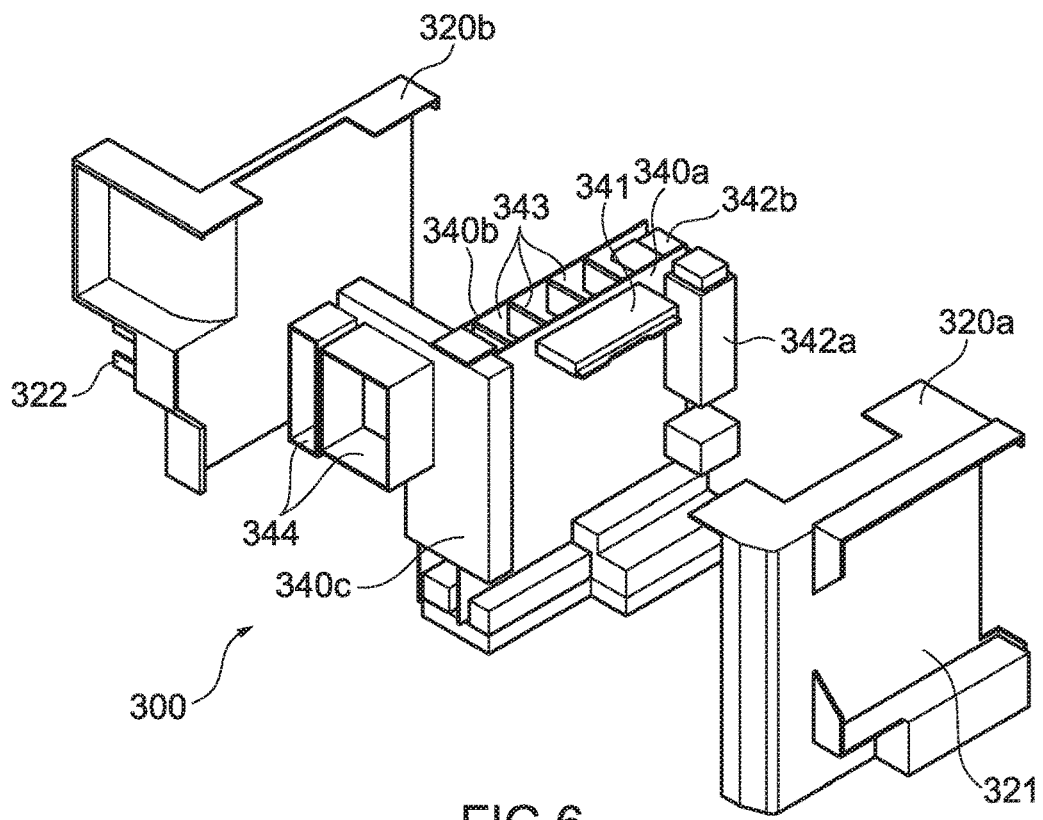
FIG. 6 is a disassembled perspective diagram of the connection box shown in FIG. 5.

FIG. 5 is a perspective diagram showing a connection box according to an embodiment of the molded article. FIG. 6 is a disassembled perspective diagram of the connection box shown in FIG. 5. A connection box 300 is formed, for example, as a junction box to be installed on the indoor side of an automobile. This connection box 300 is provided with a case 320 including a first case 320a and a second case 320b.

The connection box 300 is provided with a first substrate 340a, a second substrate 340b, and a third substrate 340c in the accommodating space inside thereof. The first substrate 340a and the second substrate 340b are disposed in such a way as to be in parallel with each other, and the third substrate 340c is disposed in such a way as to be vertically connected to end portions of the first substrate 340a and the second substrate 340b.

On a mounting surface 321 of the first case 320a, an electronic control unit (ECU: Electronic Control Unit) not shown in the figures is to be installed. A connector 341 for ECU of the first substrate 340a is disposed in such a way as to protrude from the mounting surface 321 and can electrically connect the circuit of the first substrate 340a to ECU.

From the end portion of the second case 320b, a connector 322 for mounting a relay, the connector integrated with the case 320 of the connection box 300, protrudes. A relay not shown in the figures can be mounted to the connector 322 for mounting a relay.

An indoor side connector 342a is disposed on the first substrate 340a, and an indoor side connector 342b is disposed on the second substrate 340b. These indoor side connectors 342a, 342b are each electrically connected to a circuit on the indoor side of an automobile through a wire harness not shown in the figures. A connector 343 for mounting a relay is disposed on the second substrate 340b. In the example shown in the figures, three relays can be loaded to the connector 343 for mounting a relay. An engine room side connector 344 is disposed on the third substrate 340c. This engine room side connector 344 is to be electrically connected to a circuit on the engine room side through a wire harness not shown in the figures.

In this way, the case 320 and connectors 322, 341 to 344 of the connection box 300 are formed using the thermoplastic resin composition, and therefore weight reduction and high strengthening can be achieved, and recyclability can be improved.

The method of producing the connection box and the connector is not particularly limited, and the connection box and the connector can be molded by injection molding of injecting the thermoplastic resin composition into a metal mold. It is to be noted that the connector in the present disclosure includes a connector housing, the connector itself, a connector integrated with a connection box case, and the like.

Examples of the uses of the connection box and the connector include a material for transportation equipment, such as an automobile, a two-wheeled vehicle, a train, and an airplane, a structural member of a robot arm, parts for a robot for amusement, a material for a home electric appliance, a case body for office automation equipment, information processing equipment, and a portable terminal.

<Pulley>

Figure 7:
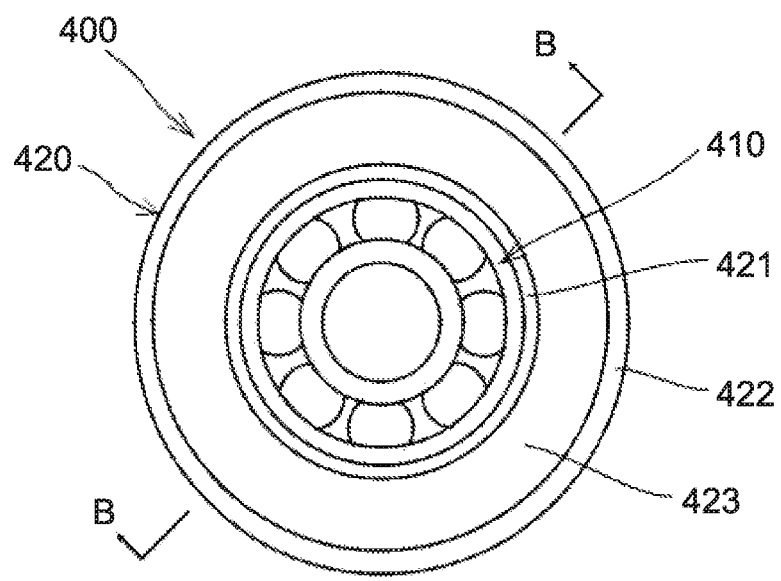
FIG. 7 is a front diagram showing an example of a pulley according to an embodiment of a molded article of the present disclosure.
Figure 8:
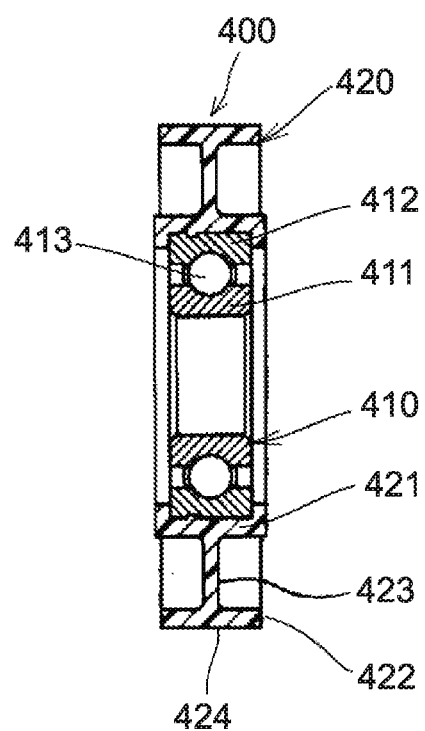
FIG. 8 is a sectional diagram of the pulley shown in FIG. 7, the sectional diagram taken along the line B-B in FIG. 7.

FIG. 7 shows a front diagram of a pulley according to an embodiment of the molded article, and FIG. 8 shows a sectional diagram of FIG. 7, the sectional diagram taken along the line B-B in FIG. 7. As shown in FIGS. 7 and 8, a pulley 400 is formed by a rolling bearing 410 and a resin part 420 integrally molded around the rolling bearing 410. The rolling bearing 410 includes an inner ring 411, an outer ring 412, and a rolling element 413 provided between the inner and outer rings. The resin part 420 is formed using the thermoplastic resin composition. The resin part 420 is provided with a cylindrical boss 421, a cylindrical rim 422, and an annular part 423 that connects the boss 421 and the rim 422. The outer peripheral surface 424 of the rim 422 is a guide surface of a belt not shown in the figures.

FIG. 7 shows an example where the resin part 420 is formed using the thermoplastic resin composition, but the whole pulley may be formed using the thermoplastic resin composition. This can contribute to weight reduction and high strengthening of the pulley 400. The method of producing the pulley 400 is not particularly limited, but the pulley 400 can be molded by injection molding of disposing the rolling bearing 410 in a metal mold and injecting the thermoplastic resin composition into the metal mold. Thereby, the resistance against wear of a metal mold and the smoothness of the edge (sharp-edge characteristic) of the resin part 420 can be improved. In addition, by performing injection molding using the thermoplastic resin composition, a pulley 400 excellent in size accuracy can be molded.

Examples of the use of the pulley include a material for transportation equipment, such as an automobile, a two-wheeled vehicle, a train, and an airplane, a structural member of a robot arm, parts for a robot for amusement, a material for a home electric appliance, a case body for office automation equipment, information processing equipment, and a portable terminal.

<Film for House>

Figure 9:
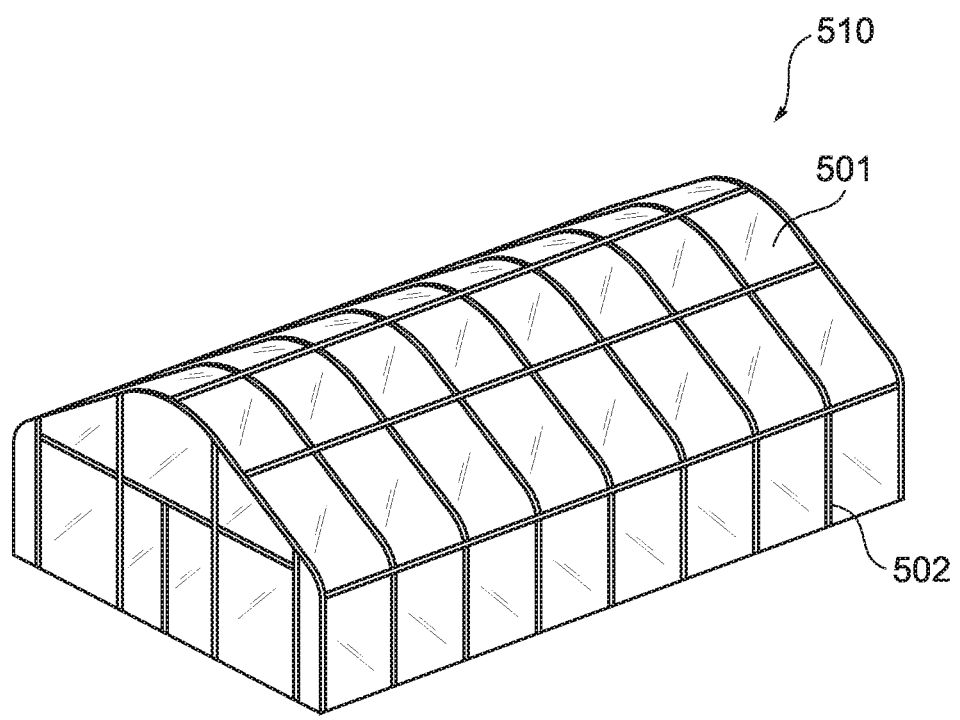
FIG. 9 is a perspective diagram showing an example of a house for agriculture using a film for a house according to an embodiment of a molded article of the present disclosure.

FIG. 9 is a schematic perspective diagram showing an example of an appearance of an agricultural house to which a film for a house according to an aspect of the molded article is applied. As shown in FIG. 9, a house 510 for agriculture is provided with a film 501 stretched over a skeleton 502.

As shown in FIG. 9, the whole surface of the house 510 for agriculture is covered with the film 501 stretched over the skeleton 502. When the film 501 is stretched over the skeleton, the house for agriculture in which a space separated from the outside is thereby formed can be made.

The material forming the skeleton 502 is not particularly limited, and a conventionally known aggregate (such as, for example, steel material and steel pipe) for use in a plastic greenhouse can be used. The film 501 is a film to be stretched over the skeleton 502, and the above-described film for a house is applied to the film 501.

The house 510 for agriculture may be provided with ventilation means (not shown in the figure), such as, for example, a ventilation fan, to be provided at the ceiling or the side of a house. In addition, it is preferable that the doorway (not shown in the figure) for a worker who is engaged in work in the house 510 for agriculture be, for example, double-entry doors or the like such that the air outside cannot directly get into the space in the house.

The film 501 in the house 510 for agriculture includes a layer which is formed using the thermoplastic resin composition. Thereby, the film 501 possesses recyclability together with weight reduction and high strengthening, and further, the surface smoothness and the adhesion performance can be improved more than a conventional film.

The film 501 (film for a house) may include a layer which is formed from the thermoplastic resin composition and can be produced by a known method, such as, for example, an inflation molding method, a T-die molding method, a lamination method, and a calender method.

The film 501 (film for a house) may be a single-layered or multi-layered film including one layer or a plurality of layers which is or are formed using the thermoplastic resin composition, or a laminated film in which on a layer formed from the thermoplastic resin composition, a resin layer formed from another resin composition is laminated. Examples of the resin capable of forming the other resin layer which can be laminated on the layer formed from the thermoplastic resin composition include a polyolefin resin which is usually used for a use as a film for a house.

The thickness of the layer which is formed from the thermoplastic resin composition, the layer included in the film 501 (film for a house) is, for example, 50 μm or more and 200 μm or less, the lower limit value is preferably 75 μm or less, and it is preferable that the upper limit value be 150 μm or less. When the film for a house is a multi-layered film, the thickness of the film for a house can appropriately be set according to the use or the like.

FIG. 9 shows an example of a case where the film 501 (film for a house) is applied to the whole surface of the house 510 for agriculture, but the house 510 for agriculture is not limited to this and may be such that the film for a house is used in some of the surfaces of the house 510 for agriculture. In addition, the house 510 for agriculture can be prepared in such a way that a framework is built in desired width, depth, and height, and the film 501 (film for a house) obtained using the above-described thermoplastic resin composition is stretched over the skeleton 502. Thereby, a house 510 for agriculture which is reduced in weight and highly strengthened and is excellent in recyclability can be obtained.

Examples of the use of the film for a house include a house for gardening, a house for raising a living thing, a house for a terrace, and a simple warehouse, not limited to a house for agriculture, the house for cultivating plants.

EXAMPLES

Hereinafter, the present disclosure will be described in more detail based on Examples, but the present disclosure is not limited to these Examples. The materials used are shown below.

<Materials Used>
(1) Thermoplastic Resin
Base resin: high density polyethylene [MFR (190° C./2.16 kg)=25 g/10 min, density=0.94 g/cm$^3$]
(2) Acid-Modified Thermoplastic Resin
FUSABOND M603 [manufactured by DuPont de Nemours, Inc., maleic acid-modified ethylene-propylene random copolymer, MFR (190° C./2.16 kg)=1.4 g/10 min, density=0.862 g/cm$^3$]
(3) Cellulose
KC FLOCK W-200 [manufactured by Nippon Paper Industries Co., Ltd., powdered cellulose having an average particle diameter of about 32 μm]
(4) Ionic Compound
Ionic compound: 1-butyl-3-methylimidazolium acetate (melting point: −20° C. or lower)

Example 1

A cellulose-reinforced thermoplastic resin was prepared by the following steps.
1) Step of Preparing Cellulose Composition
In an acetone solvent, 90 parts by mass of powdered cellulose was dispersed, and after 10 parts by mass of 1-butyl-3-methylimidazolium acetate, which is an ionic liquid, was mixed therein, a resultant mixture was left to stand for 12 hours or more in a container which a lid was put on while the mixture was being agitated every several hours. The lid of the container was then opened to dry the acetone solvent, and after the acetone solvent evaporated almost completely, the container was stored further in a thermostatic chamber of 80° C. for 12 hours or more for drying moisture.

2) Step of Kneading Cellulose Composition and Thermoplastic Resin (Production of Cellulose-Reinforced Thermoplastic Resin Composition)

A cellulose-reinforced thermoplastic resin composition was produced by performing extrusion in such a way that while FUSABOND M603 [manufactured by DuPont de Nemours, Inc.], which is an acid-modified thermoplastic resin, was being fed to a twin-screw extruder [KZW15TW-45MG-NH manufactured by TECHNOVEL CORPORATION] at an outlet temperature of 150° C. and at a rate of 300 g/hour, the cellulose composition prepared above was fed by the second feeder at a rate of 300 g/hour. On that occasion, the number of rotations of screws was set to 100 rpm. In this extrusion process, the acid-modified thermoplastic resin and the powdered cellulose are kneaded, so that the powdered cellulose is dispersed and the cellulose fiber is thereby micronized. In addition, it is considered that the micronization further progresses also in the following preparation step of 3). It is to be noted that even if the micronization is insufficient in this kneading step of 2), micronization can be done by performing the following preparation step of 3).

3) Step of Preparing Cellulose-Reinforced Thermoplastic Resin Composition Containing Base Resin, Which is Thermoplastic Resin>

The cellulose-reinforced thermoplastic resin composition, in which the cellulose fiber micronized by the above-described extrusion is dispersed in the acid-modified thermoplastic resin, and the base resin, which is a thermoplastic resin, were dry-blended such that a ratio of the base resin to the acid-modified thermoplastic resin was made 80:20 in terms of mass ratio with a twin-screw extruder [KZW15TW-45MG-NH manufactured by TECHNOVEL CORPORATION] to prepare and produce a cellulose-reinforced thermoplastic resin composition. On that occasion, the cellulose-reinforced resin thermoplastic resin composition was prepared while feeding was being performed at a rate of 1000 g/hour setting the outlet temperature of the twin-screw extruder to 190° C. On that occasion, the number of rotations of screws was set to 100 rpm. It is considered that also in this preparation step, the micronization of the cellulose fiber is further progressing.

4) Step of Producing Lamp Body

A lamp body provided with a resin part was prepared by performing injection molding using the cellulose-reinforced thermoplastic resin composition prepared in 3). It is to be noted that with respect to injection conditions, injection molding was carried out under the molding conditions which are generally regarded as suitable in injection molding of a lamp body.

Example 2

A cellulose-reinforced thermoplastic resin composition was produced in the same manner as in Example 1, except that the breakdowns of the base resin, the acid-modified thermoplastic resin, and the cellulose composition in Example 1 were each changed to the amount as shown in Table 1 described below. Thereafter, a lamp body was prepared using this cellulose-reinforced thermoplastic resin composition in the same manner as in the step of 4) in Example 1.

Example 3

A cellulose-reinforced thermoplastic resin composition was produced in the same manner as in Example 1, except that the breakdowns of the base resin, the acid-modified thermoplastic resin, and the cellulose composition in Example 1 were each changed to the amount as shown in Table 1 described below. Thereafter, a lamp body was prepared using this cellulose-reinforced thermoplastic resin composition in the same manner as in the step of 4) in Example 1.

Example 4

A cellulose-reinforced thermoplastic resin composition was produced in the same manner as in Example 1, except that the breakdowns of the base resin, the acid-modified thermoplastic resin, and the cellulose composition in Example 1 were each changed to the amount as shown in Table 1 described below. Thereafter, a lamp body was prepared using this cellulose-reinforced thermoplastic resin composition in the same manner as in the step of 4) in Example 1.

Example 5

A cellulose-reinforced thermoplastic resin composition was produced in the same manner as in Example 1, except that the breakdowns of the base resin, the acid-modified thermoplastic resin, and the cellulose composition in Example 1 were each changed to the amount as shown in Table 1 described below. Thereafter, a lamp body was prepared using this cellulose-reinforced thermoplastic resin composition in the same manner as in the step of 4) in Example 1.

Example 6

A cellulose-reinforced thermoplastic resin composition was produced in the same manner as in Example 1, except that the breakdowns of the base resin, the acid-modified thermoplastic resin, and the cellulose composition in Example 1 were each changed to the amount as shown in Table 1 described below. Thereafter, a lamp body was prepared using this cellulose-reinforced thermoplastic resin composition in the same manner as in the step of 4) in Example 1.

Example 7

A cellulose-reinforced thermoplastic resin composition was prepared and produced in such a way that powdered cellulose itself was used in place of the cellulose composition without performing the step of 1) in Example 1, and in the step of 2) in Example 1, 11.1 parts by mass of the powdered cellulose based on 100 parts by mass of the thermoplastic resin was compounded to perform extrusion with a twin-screw extruder [KZW15TW-45MG-NH manufactured by TECHNOVEL CORPORATION]. Thereafter, a lamp body was prepared using this cellulose-reinforced thermoplastic resin composition in the same manner as in the step of 4) in Example 1.

Comparative Example 1

In the step of 1) in Example 1, 70 parts by mass of an ionic liquid A based on 30 parts by mass of the powdered cellulose was compounded. In this case, the powdered cellulose dissolved, and the cellulose recrystallized partially in the acetone solvent, causing difficulty in handling properties because the cellulose lysate which became highly viscous liquid after being dried was clung, or other reasons, thus, in the step of 2), an obtained composition was pelletized using LABO PLASTOMILL [Kneading/Extrusion Molding Evaluation Tester LABO PLASTOMILL/MICRO manufactured by Toyo Seiki Seisaku-sho, Ltd.] instead of the twin-screw extruder to prepare and produce a thermoplastic resin composition. Further, in the step of 3), a cellulose-reinforced thermoplastic resin composition was produced in the same manner as in the step of 3) in Example 1, except that the base resin was dry-blended such that the base resin:the acid-modified thermoplastic resin was made 80:20 in terms of mass ratio. Thereafter, a lamp body was prepared using this cellulose-reinforced thermoplastic resin composition in the same manner as in the step of 4) in Example 1.

Example 8

A cellulose-reinforced thermoplastic resin composition was prepared by performing the steps of 1) to 3) in Example 1 in the same manner as in Example 1.
5) Step of Producing Speaker Unit
Injection molding was performed using the cellulose-reinforced thermoplastic resin composition prepared above to prepare a speaker unit provided with a resin part. It is to be noted that with respect to injection conditions, injection molding was carried out under the molding conditions which are generally regarded as suitable in injection molding of a speaker unit.

Examples 9 to 14

Speaker units were each prepared using each of the cellulose-reinforced thermoplastic resin compositions produced in Examples 2 to 7 in the same manner as in the step of 5) in Example 8.

Comparative Example 2

A speaker unit was prepared using the cellulose-reinforced thermoplastic resin composition produced in Comparative Example 1 in the same manner as in the step of 5) in Example 8.

Example 15

A cellulose-reinforced thermoplastic resin composition as prepared by performing the steps of 1) to 3) in Example 1 in the same manner as in Example 1.
6) Step of Producing Connection Box and Connector
Injection molding was performed using the cellulose-reinforced thermoplastic resin composition prepared above to prepare a connection box and a connector each provided with a resin part. It is to be noted that with respect to injection conditions, injection molding was carried out under the molding conditions which are generally regarded as suitable in injection molding of a connection box and a connector.

Examples 16 to 21

Connection boxes and connectors were each prepared using each of the cellulose-reinforced thermoplastic resin compositions produced in Examples 2 to 7 in the same manner as in the step of 6) in Example 15.

Comparative Example 3

A connection box and a connector were each prepared using the cellulose-reinforced thermoplastic resin composition produced in Comparative Example 1 in the same manner as in the step of 6) in Example 15.

Example 22

A cellulose-reinforced thermoplastic resin composition was prepared by performing the steps of 1) to 3) in Example 1 in the same manner as in Example 1.

7) Step of Producing Pulley

Injection molding was performed using the cellulose-reinforced thermoplastic resin composition prepared above to prepare a pulley provided with a resin part. It is to be noted that with respect to injection conditions, injection molding was carried out under the molding conditions which are generally regarded as suitable in injection molding of a pulley.

Examples 23 to 28

Pulleys were each prepared using each of the cellulose-reinforced thermoplastic resin compositions produced in Examples 2 to 7 in the same manner as in the step of 7) in Example 22.

Comparative Example 4

A pulley was prepared using the cellulose-reinforced thermoplastic resin composition produced in Comparative Example 1 in the same manner as in the step of 7) in Example 22.

Example 29

A cellulose-reinforced thermoplastic resin composition was prepared by performing the steps of 1) to 3) in Example 1 in the same manner as in Example 1.

8) Step of Producing Film for House

A single-layered film having a thickness of 100 μm was prepared to obtain a film for a house by molding the cellulose-reinforced thermoplastic resin composition prepared above into a film using a T-die cast film production apparatus at an extruding temperature of 200° C.

Examples 30 to 35

Films for a house were each prepared using each of the cellulose-reinforced thermoplastic resin compositions produced in Examples 2 to 7 in the same manner as in the step of 8) in Example 29.

Comparative Example 5

A film for a house was prepared using the cellulose-reinforced thermoplastic resin composition produced in Comparative Example 1 in the same manner as in the step of 8) in Example 29.

In each Example and Comparative Example prepared and produced in the manner as described above, the apparent modulus of elasticity of the cellulose contained in each cellulose-reinforced thermoplastic resin composition was measured for the cellulose-reinforced thermoplastic resin compositions in the following manner.

(Measurement of Apparent Modulus of Elasticity of Cellulose Contained in Thermoplastic Resin Composition)

A test specimen for a flexure test (4 mm in thickness×80 mm in length) was prepared by performing injection molding using each cellulose-reinforced thermoplastic resin composition produced above. It is to be noted that with respect to injection conditions, the injection molding was carried out under molding conditions which are generally regarded as suitable. The modulus of elasticity in flexure was calculated following JIS K 7171. The density was determined in accordance with JIS K 7112, but ethanol was used as a solvent for measurement instead of water. The volume fraction of each component of the resins and the cellulose was calculated from the obtained density. The density and modulus of elasticity of only the resins are separately calculated by JIS K 7112 and JIS K 7171. The apparent modulus of elasticity Ef of the cellulose was determined from equation (2.2) obtained by transforming the following equation (2.1). It is to be noted that Em was determined from the following equation (4.1) based on the compound rule assuming formula (4.2). This modulus of elasticity is defined as $Ef_1$.

$$Ec = EmVm + EfVf \quad (2.1)$$

$$Ef = \{Ec - Em(1 - Vf)\}/Vf \quad (2.2)$$

$$Em = \sum_{p=1}^{n} EpVp \quad (4.1)$$

$$\sum_{p=1}^{n} Vp = 1 \quad (4.2)$$

On the other hand, the apparent modulus of elasticity Ef of the cellulose was determined in the same manner also for the thermoplastic resin compositions prepared in the same manner as in Examples 1 to 35 and Comparative Examples 1 to 5, except that the acid-modified thermoplastic resin and the ionic liquid, which is an ionic compound, in Examples 1 to 35 and Comparative Examples 1 to 5 were not added. The modulus of elasticity in this case is defined as $Ef_0$.

The ratio of $Ef_1$ to $Ef_0$ ($Ef_1/Ef_0$) was determined based on each modulus of elasticity, $Ef_1$ and $Ef_0$, obtained above. The acceptance level herein is a ratio of 1.1 or larger.

Obtained results are shown together in Tables 1 to 5 below. The figures for the thermoplastic resin, the cellulose composition, and breakdowns thereof in the tables are expressed by parts by mass.

TABLE 1

| Composition | | Example 1 | Example 2 | Example 3 | Example 4 | Example 5 | Example 6 | Example 7 | Comparative Example 1 |
|---|---|---|---|---|---|---|---|---|---|
| Thermoplastic resins | | 100 | 100 | 100 | 100 | 100 | 100 | 100 | 100 |
| Break down | Base resin | 80 | 80 | 80 | 99 | 98 | 50 | 80 | 80 |
| | Acid-modified thermoplastic resin | 20 | 20 | 20 | 1 | 2 | 50 | 20 | 20 |
| Cellulose composition | | 10 | 100 | 100 | 11 | 1 | 50 | 11.1 | 25 |
| Break down | Cellulose | 90 | 99.9 | 51 | 90 | 90 | 90 | 100 | 30 |
| | Ionic compound | 10 | 0.1 | 49 | 10 | 10 | 10 | 0 | 70 |

TABLE 1-continued

| Composition | Example 1 | Example 2 | Example 3 | Example 4 | Example 5 | Example 6 | Example 7 | Comparative Example 1 |
|---|---|---|---|---|---|---|---|---|
| Ratio of moduli of elasticity [after micronization of cellulose/before] z z z | 1.69 | 1.21 | 1.23 | 1.53 | 1.42 | 1.48 | 1.12 | 0.88 |

TABLE 2

| Composition | | Example 8 | Example 9 | Example 10 | Example 11 | Example 12 | Example 13 | Example 14 | Comparative Example 2 |
|---|---|---|---|---|---|---|---|---|---|
| Thermoplastic resins | | 100 | 100 | 100 | 100 | 100 | 100 | 100 | 100 |
| Break down | Base resin | 80 | 80 | 80 | 99 | 98 | 50 | 80 | 80 |
| | Acid-modified thermoplastic resin | 20 | 20 | 20 | 1 | 2 | 50 | 20 | 20 |
| Cellulose composition | | 10 | 100 | 100 | 11 | 1 | 50 | 11.1 | 25 |
| Break down | Cellulose | 90 | 99.9 | 51 | 90 | 90 | 90 | 100 | 30 |
| | Ionic compound | 10 | 0.1 | 49 | 10 | 10 | 10 | 0 | 70 |
| Ratio of moduli of elasticity [after micronization of cellulose/before] z z z | | 1.69 | 1.21 | 1.23 | 1.53 | 1.42 | 1.48 | 1.12 | 0.88 |

TABLE 3

| Composition | | Example 15 | Example 16 | Example 17 | Example 18 | Example 19 | Example 20 | Example 21 | Comparative Example 3 |
|---|---|---|---|---|---|---|---|---|---|
| Thermoplastic resins | | 100 | 100 | 100 | 100 | 100 | 100 | 100 | 100 |
| Break down | Base resin | 80 | 80 | 80 | 99 | 98 | 50 | 80 | 80 |
| | Acid-modified thermoplastic resin | 20 | 20 | 20 | 1 | 2 | 50 | 20 | 20 |
| Cellulose composition | | 10 | 100 | 100 | 11 | 1 | 50 | 11.1 | 25 |
| Break down | Cellulose | 90 | 99.9 | 51 | 90 | 90 | 90 | 100 | 30 |
| | Ionic compound | 10 | 0.1 | 49 | 10 | 10 | 10 | 0 | 70 |
| Ratio of moduli of elasticity [after micronization of cellulose/before] z z z | | 1.69 | 1.21 | 1.23 | 1.53 | 1.42 | 1.48 | 1.12 | 0.88 |

TABLE 4

| Composition | | Example 22 | Example 23 | Example 24 | Example 25 | Example 26 | Example 27 | Example 28 | Comparative Example 4 |
|---|---|---|---|---|---|---|---|---|---|
| Thermoplastic resins | | 100 | 100 | 100 | 100 | 100 | 100 | 100 | 100 |
| Break down | Base resin | 80 | 80 | 80 | 99 | 98 | 50 | 80 | 80 |
| | Acid-modified thermoplastic resin | 20 | 20 | 20 | 1 | 2 | 50 | 20 | 20 |
| Cellulose composition | | 10 | 100 | 100 | 11 | 1 | 50 | 11.1 | 25 |
| Break down | Cellulose | 90 | 99.9 | 51 | 90 | 90 | 90 | 100 | 30 |
| | Ionic compound | 10 | 0.1 | 49 | 10 | 10 | 10 | 0 | 70 |
| Ratio of moduli of elasticity [after micronization of cellulose/before] z z z | | 1.69 | 1.21 | 1.23 | 1.53 | 1.42 | 1.48 | 1.12 | 0.88 |

TABLE 5

| Composition | | Example 29 | Example 30 | Example 31 | Example 32 | Example 33 | Example 34 | Example 35 | Comparative Example 5 |
|---|---|---|---|---|---|---|---|---|---|
| Thermoplastic resins | | 100 | 100 | 100 | 100 | 100 | 100 | 100 | 100 |
| Break down | Base resin | 80 | 80 | 80 | 99 | 98 | 50 | 80 | 80 |
| | Acid-modified thermoplastic resin | 20 | 20 | 20 | 1 | 2 | 50 | 20 | 20 |
| Cellulose composition | | 10 | 100 | 100 | 11 | 1 | 50 | 11.1 | 25 |
| Break down | Cellulose | 90 | 99.9 | 51 | 90 | 90 | 90 | 100 | 30 |
| | Ionic compound | 10 | 0.1 | 49 | 10 | 10 | 10 | 0 | 70 |
| Ratio of moduli of elasticity [after micronization of cellulose/before] | | 1.69 | 1.21 | 1.23 | 1.53 | 1.42 | 1.48 | 1.12 | 0.88 |

As can be seen from Tables 1 to 5 described above, all of the thermoplastic resin compositions of Examples 1 to 35 had a ratio of the apparent moduli of elasticity of the cellulose of 1.1 or larger. That is, the ratio of the apparent moduli of elasticity of the cellulose has remarkably been improved in the thermoplastic resin compositions of Examples 1 to 35, and therefore the micronization of the cellulose has remarkably been facilitated. It is considered that this improvement is an improvement which has been achieved because an interfacial characteristic between thermoplastic resin-cellulose fiber is improved due to the maleic acid-modified ethylene-propylene random copolymer, which is an acid-modified thermoplastic resin, and therefore the transformation of force from the thermoplastic resin to the cellulose fiber has been changed for the better. In addition, by using the ionic liquid which is an ionic compound, the micronization of the cellulose further progresses, so that an effect of reinforcing the strength by the cellulose can be obtained.

Conversely, the ratio of the apparent moduli of elasticity of cellulose was lowered, as low as 0.88, in the thermoplastic resin compositions of Comparative Examples 1 to 5. It is thought that this is because the amount of the ionic compound to cellulose was too large, so that the cellulose dissolved and the crystal was lost, and therefore the cellulose was not able to exhibit the reinforcing effect even after the cellulose was kneaded with the thermoplastic resin.

From the fact that in the thermoplastic resin compositions of Examples 1 to 35 of the present disclosure, the modulus of elasticity is improved and the effect of reinforcing the thermoplastic resins is high, it is found that the thermoplastic resin compositions of Examples 1 to 35 of the present disclosure are each useful as a cellulose-reinforced resin for the use especially for molded articles such as a lamp body, a speaker unit, a connection box, a connector, a pulley, and a film for a house.

The present disclosure has been described with reference to the above-described aspects, but these do not limit the disclosure unless otherwise specified, and the present disclosure should be broadly interpreted without departing from the spirit and scope of the disclosure described in the appended claims.

What is claimed is:

1. A molded article comprising a resin part formed with a thermoplastic resin composition, the thermoplastic resin composition comprising:
   thermoplastic resins;
   cellulose; and
   an ionic compound,
   wherein at least one of the thermoplastic resins is a resin having, in a polymer molecule, at least one group selected from a group containing a partial structure of an acid anhydride and a group containing an acylated cellulose structure,
   wherein a content of the ionic compound is 0.001 times or more and less than 1.000 times a mass of the cellulose contained,
   wherein the ionic compound is represented by the following formula (1) or (2):

Formula (1)

Formula (2)

wherein $Z^1$ represents =C(Ra)— or =N—, wherein Ra represents a hydrogen atom or a substituent; $L^1$ represents a divalent linking group; $R^1$ to $R^5$ each independently represent an alkyl group, an alkenyl group, a cycloalkyl group, an aryl group, or a heterocyclic group; at least two of $R^2$ to $R^5$ are bonded to each other to form a ring; and $X^-$ represents an anion.

2. The molded article according to claim 1, wherein the compound represented by the formula (1) or (2) is represented by any one of the following formulas (1a), (1b), (2b) and (2c):

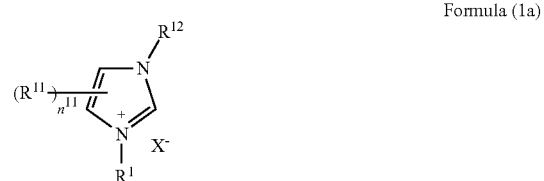

Formula (1a)

Formula (1b)

-continued

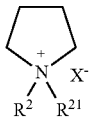

Formula (2b)

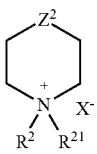

Formula (2c)

wherein $R^1$, $R^2$, and $X^-$ are as defined for $R^1$, $R^2$, and $X^-$ in the formula (1) or (2); $R^{11}$ and $R^{12}$ each independently represent a substituent; $n^{11}$ represents an integer of 0 to 3, and $n^{12}$ represents an integer of 0 to 5; when two or more $R^{11}$ exist, a plurality of $R^{11}$ are optionally the same with or different from each other, and at least two $R^{11}$ are optionally bonded to each other to form a ring;

$R^{21}$ is as defined for $R^2$; and $Z^2$ represents a single bond, a methylene group, —C(=O)—, —O—, —S—, —S(=O)—, —SO$_2$—, —N(R$\alpha$1)-, or —N$^+$(R$\alpha$1)(R$\alpha$2)-, wherein R$\alpha$1 represents a hydrogen atom or a substituent, R$\alpha$2 represents a substituent, and R$\alpha$1 and R$\alpha$2 are optionally bonded to each other to form a ring.

3. The molded article according to claim 1, wherein the $X^-$ represents a halogen ion, a carboxylate anion, a sulfonate anion, a phosphate anion, a phosphonate anion, a dicyanamide ion, or a bis(trifluoromethanesulfonyl)imide ion.

4. The molded article according to claim 2, wherein the $X^-$ represents a halogen ion, a carboxylate anion, a sulfonate anion, a phosphate anion, a phosphonate anion, a dicyanamide ion, or a bis(trifluoromethanesulfonyl)imide ion.

5. The molded article according to claim 1, wherein the cellulose is a plant-derived, fibrous cellulose.

6. The molded article according to claim 1, wherein a content of the cellulose is 1 to 100 parts by mass based on 100 parts by mass of the thermoplastic resins.

7. The molded article according to claim 1, wherein a content of the resin having in a polymer molecule a group containing an acid anhydride is 1 to 50% by mass in the thermoplastic resins.

8. The molded article according to claim 1, wherein an apparent modulus of elasticity ($Ef_1$) of the cellulose contained in the thermoplastic resin composition is equal to or larger than 1.1 times an apparent modulus of elasticity ($Ef_0$) of the cellulose contained in a thermoplastic resin composition not containing a resin having, in a polymer molecule, the group containing a partial structure of an acid anhydride.

* * * * *